(12) United States Patent
Yaghi et al.

(10) Patent No.: US 11,998,889 B2
(45) Date of Patent: Jun. 4, 2024

(54) MULTIVARIATE AND OTHER METAL-ORGANIC FRAMEWORKS, AND USES THEREOF

(71) Applicant: The Regents of the University of California, Oakland, CA (US)

(72) Inventors: Omar M. Yaghi, Berkeley, CA (US); Nikita Hanikel, Berkeley, CA (US); Hao Lyu, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 510 days.

(21) Appl. No.: 17/330,402

(22) Filed: May 25, 2021

(65) Prior Publication Data

US 2021/0283574 A1    Sep. 16, 2021

Related U.S. Application Data

(63) Continuation of application No. PCT/US2019/063442, filed on Nov. 26, 2019.

(60) Provisional application No. 62/771,537, filed on Nov. 26, 2018.

(51) Int. Cl.
| | |
|---|---|
| *B01D 53/02* | (2006.01) |
| *B01D 53/26* | (2006.01) |
| *B01J 20/22* | (2006.01) |
| *C07F 5/06* | (2006.01) |
| *E03B 3/28* | (2006.01) |

(52) U.S. Cl.
CPC .......... *B01J 20/226* (2013.01); *B01D 53/261* (2013.01); *C07F 5/069* (2013.01); *E03B 3/28* (2013.01); *B01D 2253/204* (2013.01)

(58) Field of Classification Search
CPC ............. B01D 2253/204; B01D 53/02; B01D 53/261; B01J 20/226; C02F 1/14; Y02C 20/20; Y02C 20/40
See application file for complete search history.

(56) References Cited

U.S. PATENT DOCUMENTS

| | | | | |
|---|---|---|---|---|
| 10,702,851 | B2 * | 7/2020 | Ohashi | ..................... C07F 7/003 |
| 11,008,347 | B2 * | 5/2021 | Ohashi | ................ B01D 53/261 |
| 11,192,066 | B2 * | 12/2021 | Trukhan | ............... B01J 29/0308 |
| 2017/0008915 | A1 | 1/2017 | Yaghi et al. | |
| 2018/0171604 | A1 | 6/2018 | Kim et al. | |
| 2018/0261882 | A1 | 9/2018 | Chang et al. | |

FOREIGN PATENT DOCUMENTS

| | | |
|---|---|---|
| JP | 2018080146 A | 5/2018 |
| WO | WO2015127033 A | 8/2015 |

OTHER PUBLICATIONS

Extended European Search Report, EP counterpart, EP 19891188.5.
Zheng et al. 2022, Broadly Tunable Atmospheric Water Harvesting in Multivariate Metal-Organic Frameworks, J. Am. Chem. Soc.
Hanikel et al. 2021, Evolution of water structures in metal-organic frameworks for improved atmospheric water harvesting, Science 374, 454-459.

* cited by examiner

*Primary Examiner* — Christopher P Jones
(74) *Attorney, Agent, or Firm* — Richard Aron Osman

(57) ABSTRACT

Compositions comprising multivariate metal-organic frameworks and other single-linker metal-organic frameworks are used for containing and storing a gas or fluid or for water harvesting or water purification applications.

20 Claims, 18 Drawing Sheets

MULTIVARIATE AND OTHER METAL-ORGANIC FRAMEWORKS, AND USES THEREOF

CROSS-REFERENCE TO RELATED APPLICATIONS

This application is a national stage application under 35 U.S.C. § 371 of International Application No. PCT/US2019/063442, filed internationally on Nov. 26, 2019, which claims priority to U.S. Provisional Patent Application No. 62/771,537, filed Nov. 26, 2018, each of which is incorporated herein by reference in its entirety.

FIELD

The present disclosure relates generally to water harvesting, and more specifically to systems and methods for harvesting water from surrounding air using various types of metal-organic frameworks.

BACKGROUND

Water scarcity has been indicated as one of the major evolving global risks by the World Economic Forum in the recent Global Risks Report 2018.[1] About two thirds of the global population faces water scarcity for at least one month of the year.[2] The water supply crisis is expected to exacerbate with growing population and ongoing climate change.[3] Thus, different strategies were proposed and implemented to cope with this global challenge.[4]

One realm of possible solutions relies on the usage of atmospheric humidity as an ubiquitous water resource.[5] This includes fog harvesting[6], water collection via dewing[7] or water vapor concentration by desiccants.[8] However, these technologies require either the occurrence of a very high relative humidity (RH~100%) or high energetic investment for regeneration of the employed sorbent.[9]

Only recently, metal-organic frameworks (MOFs) were found to be a promising class of materials circumventing the above described challenges of water harvesting from air.[9] In particular, MOFs exhibit desirable properties for water harvesting applications under arid conditions, i.e. adsorption of large amounts of atmospheric water at low RH and successive energy-efficient desorption without loss of porosity.

While the practical employment of MOFs for water harvesting has been realized recently,[10] only few MOFs are reported to be suitable for water harvesting under arid conditions.[11] This invention provides a guideline to fine-tune and improve the water sorption properties by employing metal-organic frameworks constructed from a combination of two or more building blocks, which may generally be referred to as multivariate (MTV) MOFs.[12] This approach will not only drastically expand the variety of water harvesting systems but will also allow for adjustment of the water sorption properties for the respective application.

BRIEF SUMMARY

The invention provides multivariate and other metal-organic frameworks (MOFs) for water harvesting and other uses. In some variations, the multivariate metal-organic frameworks (MTV-MOFs) may have mixed metals in the secondary building units and/or mixed organic ligands.

In some aspects, provided is a MOF comprising repeating cores, wherein the cores comprise secondary building units (SBUs) connected to organic ligands. In some variations, the secondary building units comprise one or more metals or metal-containing complexes. In one variation, the secondary building units form 1D rod-like chains or distinct multinuclear metal clusters. In certain variations, the organic ligands comprise one or more linear ditopic moieties, v-shaped ditopic moieties, trigonal tritopic moieties, square or rectangular tetratopic moieties, or tetrahedral tetratopic moieties. In one variation, such moieties comprise 5-membered or 6-membered rings substituted with at least two carboxylate groups.

In an aspect the invention provides a multivariate metal-organic framework (MTV-MOF) of inorganic metal clusters (secondary building units, SBUs) and a combination of two or more different organic units/ligands (linkers).

In another aspect, provided is a MOF made up of secondary building units and one type of organic ligand.

In some embodiments of the foregoing, the organic ligands are linear ditopic, v-shaped ditopic, trigonal tritopic, square or rectangular tetratopic, or tetrahedral tetratopic. In one variation, at least one of the organic ligands is v-shaped as disclosed herein.

In some variations, the secondary building units are metal clusters, or comprise a metal or metal-containing complex. In certain variations, the secondary building units form 1D rod-like chains or distinct multinuclear metal clusters.

In some embodiments, the metal in the secondary building unit is selected from zirconium, nickel, iron, copper, manganese and aluminum, and/or from magnesium, calcium, strontium, barium, titanium, zinc, indium, cadmium, hafnium, lead, cobalt, and chromium.

In an aspect the invention provides a device such as a water harvester, comprising a moisture sorption unit comprising one or more of the MOFs described herein.

In an aspect the invention provides a method of using one or more of the MOFs described herein, comprising containing in, storing in and/or extracting from the composition a predetermined gas or fluid, such as $CO_2$, $H_2O$, $H_2$, $CH_4$, $C_2H_4$, $C_2H_2$, etc.

In an aspect the invention provides a method of using one or more of the MOFs described herein, comprising utilizing the composition for water harvesting or water purification applications.

In another aspect the invention provides a water harvester comprising a moisture sorption unit comprising a MOF of formula Al(OH)(2,5-PylDC), wherein 2,5-PylDC is 2,5-pyrroledicarboxylate.

In an aspect the invention provides a method of using the water harvester comprising for water harvesting or water purification applications.

The invention encompasses all combination of the particular embodiments recited herein, as if each combination had been laboriously recited.

DESCRIPTION OF THE FIGURES

The present application can be understood by reference to the following description taken in conjunction with the accompanying figures.

FIG. 2 shows views along the a-axis and c-axis.

FIG. 3 shows an excerpt of the secondary building units of the MOF. Oxygen atoms are located at the vertices of the octahedron, coordinating to an aluminum atom at the center of the octahedron.

DETAILED DESCRIPTION

Figure 1A:
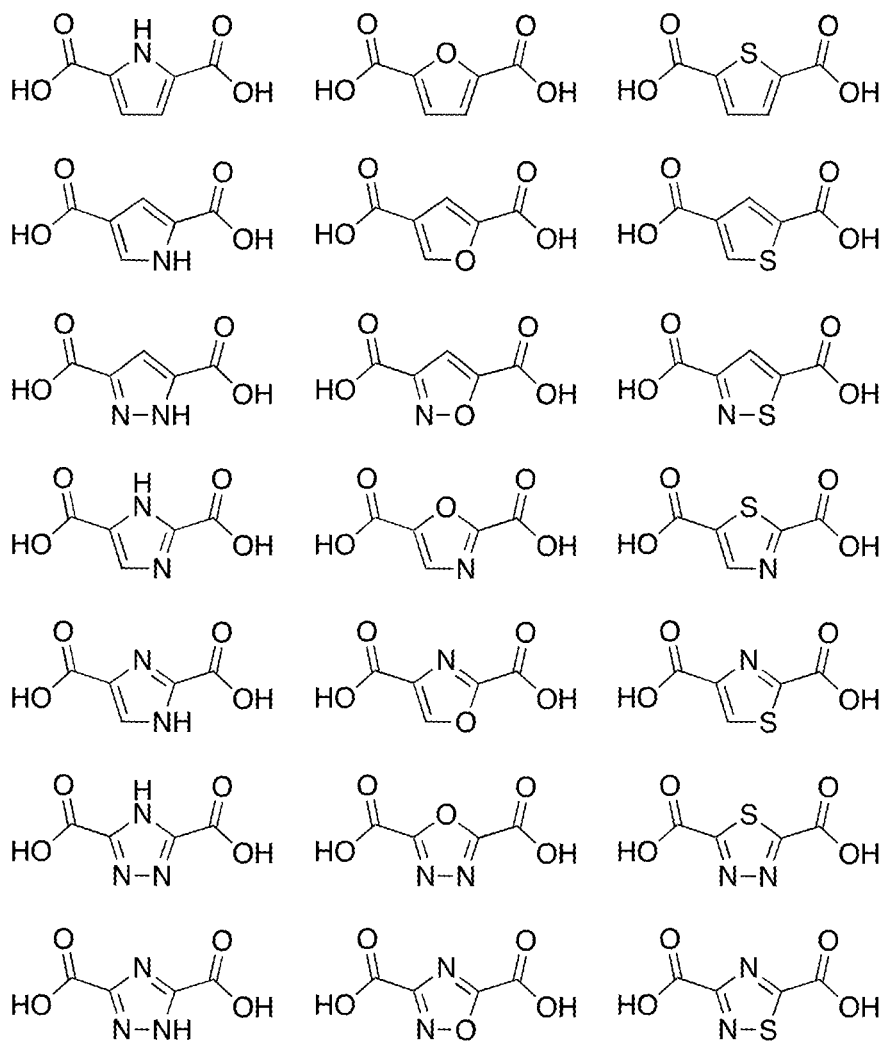
FIGS. 1A and 1B depict a non-comprehensive list of compounds that may be used to form organic ligands connected to secondary building units in the MOFs described herein. These linkers can also be combined in systems for water harvesting to expand the realm of MOF materials for water harvesting.

The following description sets forth exemplary methods, parameters and the like. It should be recognized, however, that such description is not intended as a limitation on the scope of the present disclosure but is instead provided as a description of exemplary embodiments.

Unless contraindicated or noted otherwise, in these descriptions and throughout this specification, the terms "a" and "an" mean one or more, the term "or" means and/or. It is understood that the examples and embodiments described herein are for illustrative purposes only and that various modifications or changes in light thereof will be suggested to persons skilled in the art and are to be included within the spirit and purview of this application and scope of the appended claims.

In an aspect, provided herein are organic-inorganic hybrid materials, in particular metal-organic frameworks (MOFs), constructed from one or more organic building blocks, particularly for water harvesting applications. MOFs are shown to exhibit desirable properties for water harvesting applications under arid conditions. For example, MOFs may be used to adsorb large amounts of atmospheric water at low relative humidity and successive energy-efficient desorption without loss of porosity. This invention identifies reported as well as new MOFs which are particularly suitable for water harvesting under arid conditions. Furthermore, the invention provides technology to tune and improve the water harvesting properties by employing multivariate (MTV) MOFs. Such metal-organic frameworks may be constructed from a combination of two or more organic units/ligands.

The described approach for tuning of water sorption properties can be applied in MOF-based water harvesting devices. The harvested water can be used for human consumption or irrigation of crops.

Additionally, the tuning of water sorption properties by employment of the MOFs described herein can be used in other water sorption based applications, such as in heat pumps, dehumidifiers, adsorption refrigerators, solar cooling systems, dryers, organic light emitting devices and secondary battery devices.

The following description describes various types of MOFs, including single-linker MOFs and MTV-MOFs, for water sorption applications, in particular water harvesting.

In some aspects, provided is a MOF comprising repeating cores, wherein the cores comprise secondary building units connected to organic ligands.

In some embodiments, the organic ligands comprise one or more linear ditopic moieties, v-shaped ditopic moieties, trigonal tritopic moieties, square or rectangular tetratopic moieties, or tetrahedral tetratopic moieties. In one variation, the organic ligands comprise v-shaped ditopic moieties.

In some variations of the organic ligands, such moieties comprise 5-membered or 6-membered rings substituted with at least two carboxylate groups. In one variation, such moieties comprise 5-membered or 6-membered rings substituted with two carboxylate groups.

In certain variations, the organic ligands comprise one or more moieties of Formula I-IX:

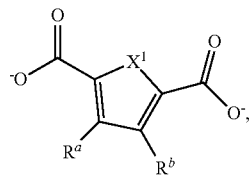
(I)

wherein $X^1$ is NH, O or S, and each of $R^a$ and $R^b$ is independently H or alkyl;

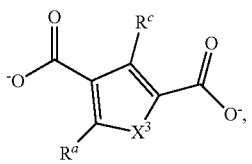
(II)

wherein $X^3$ is NH, O or S, and each of $R^a$ and $R^c$ is independently H or alkyl;

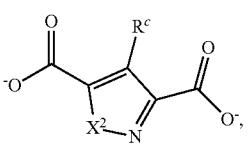
(III)

wherein $X^2$ is NH, O or S, and $R^c$ is H or alkyl;

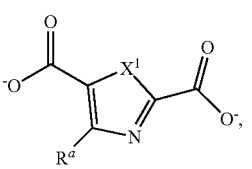
(IV)

wherein $X^1$ is NH, O or S, and $R^a$ is H or alkyl;

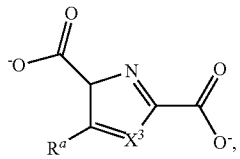
(V)

wherein $X^3$ is NH, O or S, and $R^a$ is H or alkyl;

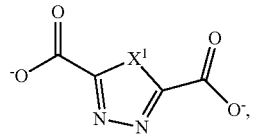
(VI)

wherein $X^1$ is NH, O or S;

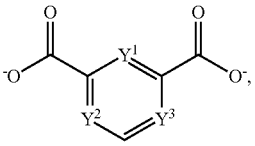
(VII)

wherein $Y^1$, $Y^2$ and $Y^3$ are independently CH or N;

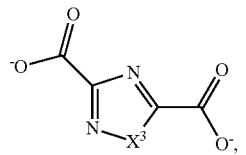
(VIII)

wherein $X^3$ is NH, O or S; and

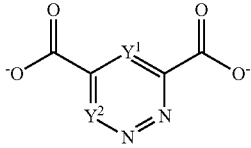
(IX)

wherein $Y^1$ and $Y^2$ are independently CH or N.

In one variation of the moiety of Formula (I), $X^2$ is NH or O, and R is H or alkyl.

In one variation of the moiety of Formula (IV), $X^1$ is NH or O, and $R^a$ is H or alkyl.

In one variation of the moiety of Formula (V), $X^1$ is NH or O, and $R^a$ is H or alkyl.

In one variation of the moiety of Formula (VI), $X^1$ is NH or O.

In certain variations, the organic ligands comprise one or more moieties of Formula (X), (XI), or (XII):

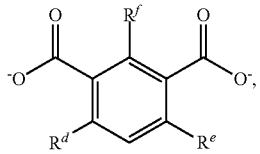
(X)

herein each of $R^d$, $R^e$ and $R^f$ is independently H or alkyl;

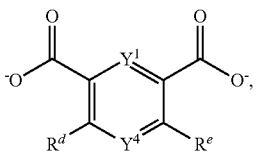
(XI)

wherein one of $Y^1$ and $Y^4$ is N, and the remaining of $Y^4$ and $Y^1$ is CH, or both $Y^1$ and $Y^4$ are N, and each of $R^d$ and R are independently H or alkyl; and

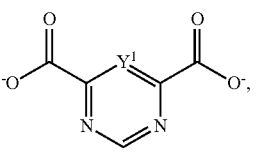
(XII)

wherein $Y^1$ is CH or N.

In some variations of the foregoing, $R^a$, $R^b$, R, $R^d$, $R^e$ and $R^f$ are each H.

In some variations, each organic ligand comprises

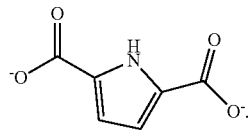

In another variation of the foregoing, each secondary building unit comprises aluminum hydroxide. For example, in one variation, the MOF is MOF-313.

In some variations, each organic ligand comprises

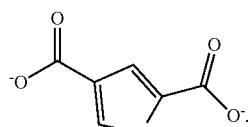

In another variation of the foregoing, each secondary building unit comprises aluminum hydroxide. For example, in one variation, the MOF is MOF-314.

In some variations, each organic ligand comprises

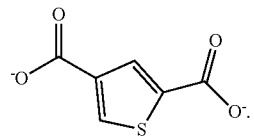

In another variation of the foregoing, each secondary building unit comprises aluminum hydroxide. For example, in one variation, the MOF is MOF-323.

In some variations, the organic ligands comprise

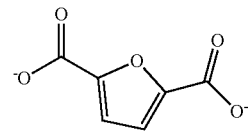

and

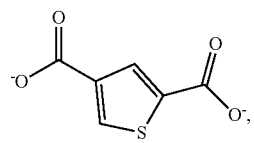

In another variation of the foregoing, each secondary building unit comprises aluminum hydroxide. For example, in one variation, the MTV-MOF is Al(OH)(2,5-FDC)(2,4-TDC). In certain variations, the MTV-MOF is Al(OH)(2,5-FDC)$_w$(2,4-TDC)$_v$, wherein w+v=1. In a certain variation, the MTV-MOF is Al(OH)(2,5-FDC)$_{0.5}$(2,4-TDC)$_{0.5}$.

In some variations, the organic ligands comprise

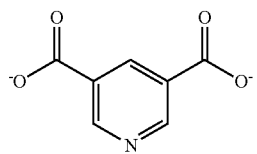

and

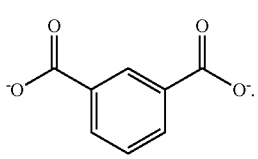

In another variation of the foregoing, each secondary building unit comprises aluminum hydroxide. For example, in one variation, the MTV-MOF is Al(OH)(3,5-PynDC)(IPA). In certain variations, the MTV-MOF is Al(OH)(3,5-PynDC)$_m$(IPA)$_n$, wherein m+n=1. In a certain variation, the MTV-MOF is Al(OH)(3,5-PynDC)$_{0.56}$(IPA)$_{0.44}$.

Figure 1B:
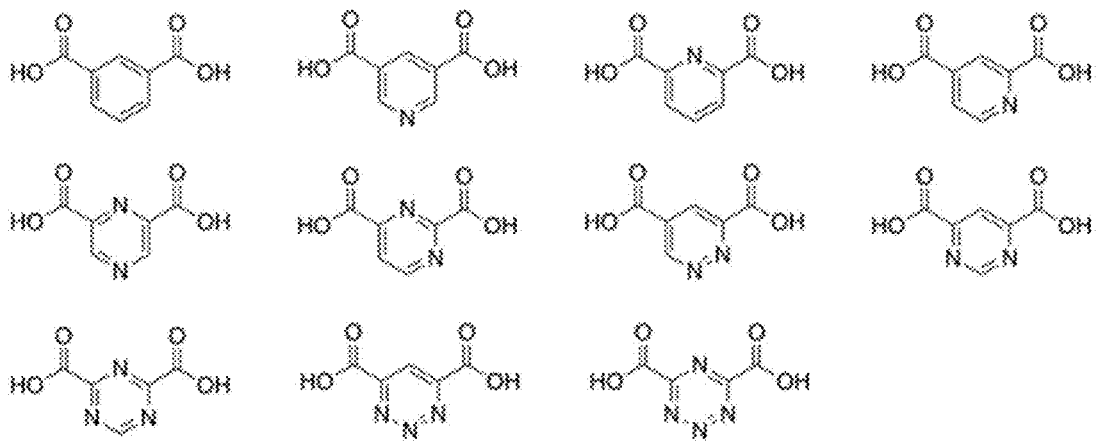

FIGS. 1A and 1B provides a non-comprehensive list of compounds that may be used to form organic ligands connected to secondary building units in the MOFs described herein. These linkers can also be combined in systems for water harvesting to expand the realm of MOF materials for water harvesting dramatically.

In other embodiments, the secondary building units comprise one or more metals or metal-containing complexes. In some variations, the secondary building units form 1D rod-like chains or distinct multinuclear metal clusters. In one variation, each secondary building unit comprises one metal or metal-containing complex.

In certain variations, each secondary building unit comprises zirconium, nickel, iron, copper, manganese, aluminum, magnesium, calcium, strontium, barium, titanium, zinc, indium, cadmium, hafnium, lead, cobalt, or chromium, or a complex thereof. In one variation, each secondary building unit comprises aluminum or an aluminum-containing complex.

As a result of the cooperative nature of water condensation in MOF,[9] the use of the MOFs described herein, including the MTV-MOFs, could enable shifting of the $P/P_0$ value at which a steep step is observed in the water vapor sorption isotherm. Further, the total water uptake of a MOF with voluminous ligands can be improved by "doping" it with less bulky ligands due to the resulting increase in the pore volume of the MTV-system. Also, linkers otherwise not forming a MOF can be included in a MTV-MOF, thus expanding the realm of water harvesting materials enormously.

This approach can be employed for fine-tuning of a system in such a way that optimal properties for a desired water sorption application can be achieved. Thus, the described invention enables the synthesis of water harvesting materials on demand.

In some variations, provided herein are Al-MOFs exhibiting 1D rod-like SBUs constructed from V-shaped molecules. Such MTV-approach can also be employed for other MOF-based water harvesting systems constructed from other metal cations and linkers with other geometries.

In certain variations, the secondary building units are connected to the organic ligands through the oxygen atoms of the carboxylate groups in the organic ligands via a cis-edge-shared octahedra geometry or a trans-edge-shared octahedra geometry.

In other aspects, provided are methods of producing the MOFs described herein. In some embodiments, the method comprises combining one or more of the compounds set forth in FIGS. 1A and 1B with a metal solution under basic conditions, at elevated temperatures. In some variations, the metal solution comprises any of the metals described herein for the MOFs. In other variations, the compounds in FIGS. 1A and 1B and the metal solution are combined with a basic solution, such as sodium hydroxide. A solid is obtained from the reaction mixture, and isolated. The isolated product can then be characterized using any suitable methods or techniques known in the art, including, for example, by x-ray diffraction (e.g., powder x-ray diffraction).

In yet other aspects, provided are methods and systems for water harvesting using one or more of the MOFs described herein. In one aspect, provided is a method of water harvesting, comprising: adsorbing water from ambient atmosphere using a water-harvesting system, wherein the water-harvesting system comprises one or more of the MOFs described herein; desorbing vapor from the one or more MOFs; and collecting water from the vapor. In another aspect, provided is a water-harvesting system, comprising an adsorbent layer comprising one or more of the MOFs described herein. In some variations of the foregoing methods and systems for water harvesting, the MOFs used are MTV-MOFs.

In some variations of the foregoing, the water-harvesting system is a passive device, in which sunlight-driven desorption of water leads to saturation in a closed environment which, consequently, leads to water condensation. In other variations, the water-harvesting system is an active device, in which a condenser is needed to collect the water. The condenser may be, for example, adjacent to the adsorbent layer in the water-harvesting system.

Enumerated Embodiments

The following enumerated embodiments are representative of some aspects of the invention.
1. A composition comprising a multivariate metal-organic framework (MTV-MOF) of inorganic metal clusters (secondary building units, SBUs) and a combination of two or more different organic units (linkers).
2. The composition of embodiment 1, wherein the linkers are selected from v-shaped, trigonal or tritopic linkers; or square/rectangular-shaped tetratopic linkers; or tetrahedral tetratopic linkers.
3. The composition of embodiment 1, wherein at least one of the linkers is a v-shaped linker disclosed herein.
4. The composition of embodiment 1, wherein the metal clusters are infinite 1D rod-like chains or distinct multinuclear metal clusters.
5. The composition of any one of embodiments 1 to 4, wherein the MOF metal is selected from zirconium, nickel, iron, copper, manganese and aluminum, and/or from magnesium, calcium, strontium, barium, titanium, zinc, indium, cadmium, hafnium, lead, cobalt, and chromium.
6. A device such as a water harvester, comprising a moisture sorption unit comprising the composition of any one of embodiments 1 to 5.
7. A method of using the composition of any one of embodiments 1 to 6, comprising containing in, storing in and/or extracting from the composition a predetermined gas or fluid, such as $CO_2$, $H_2O$, $H_2$, $CH_4$, $C_2H_4$, $C_2H_2$, etc.
8. A method of using the composition of any one of embodiments 1 to 6, comprising utilizing the composition for water harvesting or water purification applications.
9. A water harvester comprising a moisture sorption unit comprising a MOF of formula Al(OH)(2,5-PylDC), wherein 2,5-PylDC is 2,5-pyrroledicarboxylate.
10. A method of using the harvester of embodiment 9, for water harvesting or water purification applications.
11. A metal-organic framework (MOF), comprising repeating cores, wherein the cores comprise secondary building units connected to organic ligands,
    wherein the secondary building units comprise one or more metals or metal-containing complexes,
    wherein the organic ligands comprise one or more linear ditopic moieties, v-shaped ditopic moieties, trigonal tritopic moieties, square or rectangular tetratopic moieties, or tetrahedral tetratopic moieties, wherein the moieties comprise 5-membered or 6-membered rings substituted with at least two carboxylate groups, and
    wherein the secondary building units are connected to the organic ligands through the oxygen atoms of the carboxylate groups in the organic ligands.
12. The MOF of embodiment 11, wherein the secondary building units form 1D rod-like chains or distinct multinuclear metal clusters.

13. The MOF of embodiment 11 or 12, wherein the organic ligands comprise one or more moieties of Formula (I)-(XII):

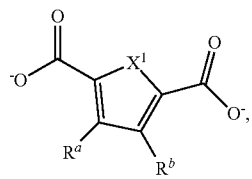
(I)

wherein $X^1$ is NH, O or S, and each of $R^a$ and $R^b$ is independently H or alkyl;

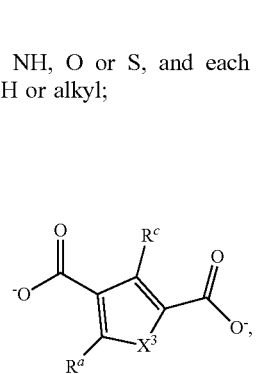
(II)

wherein $X^3$ is NH, O or S, and each of $R^a$ and $R^c$ is independently H or alkyl;

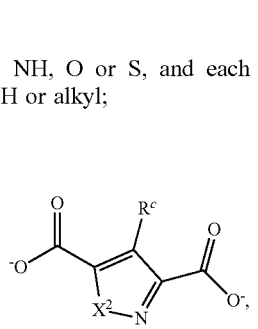
(III)

wherein $X^2$ is NH, O or S, and $R^c$ is H or alkyl;

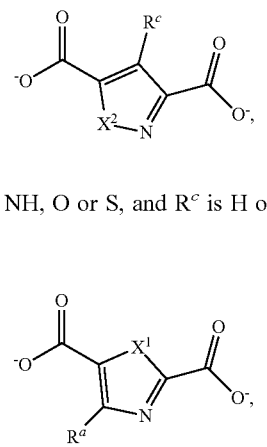
(IV)

wherein $X^1$ is NH, O or S, and $R^a$ is H or alkyl;

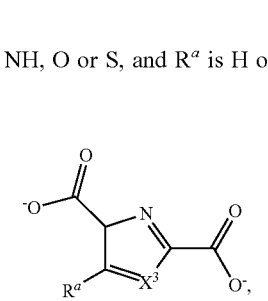
(V)

wherein $X^3$ is NH, O or S, and $R^a$ is H or alkyl;

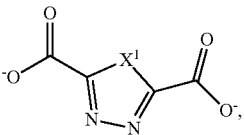
(VI)

wherein $X^1$ is NH, O or S;

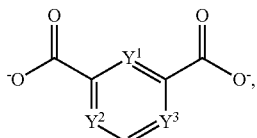
(VII)

wherein $Y^1$, $Y^2$ and $Y^3$ are independently CH or N;

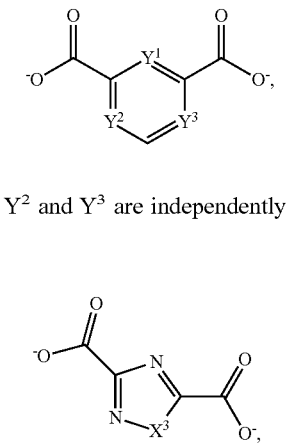
(VIII)

wherein $X^3$ is NH, O or S;

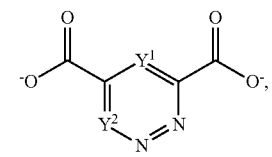
(IX)

wherein $Y^1$ and $Y^2$ are independently CH or N.

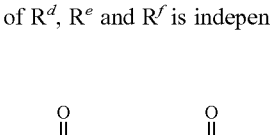
(X)

wherein each of $R^d$, $R^e$ and $R^f$ is independently H or alkyl;

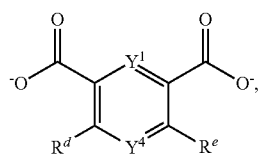
(XI)

wherein one of $Y^1$ and $Y^4$ is N, and the remaining of $Y^4$ and $Y^1$ is CH, or both $Y^1$ and $Y^4$ are N, and each of $R^d$ and $R^e$ are independently H or alkyl; and

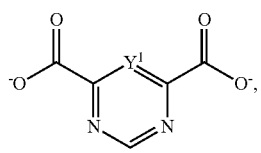

(XII)

wherein Y¹ is CH or N.

14. The MOF of embodiment 13, wherein the organic ligands comprise one or more moieties of Formula (I)-(VII).
15. The MOF of embodiment 13, wherein the organic ligands comprise one or more moieties of Formula (VIII) or (IX).
16. The MOF of embodiment 13, wherein the organic ligands comprise one or more moieties of Formula (X), (XI) or (XII).
17. The MOF of any one of embodiments 13 to 16, wherein $R^a$, $R^b$, $R^c$, $R^d$, $R^e$ and $R^f$ are each H.
18. The MOF of embodiment 11 or 12, wherein the organic ligands comprise one or more moieties:

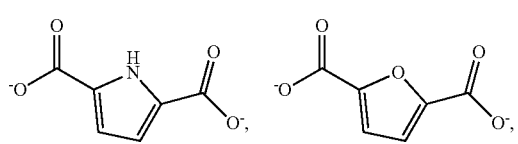
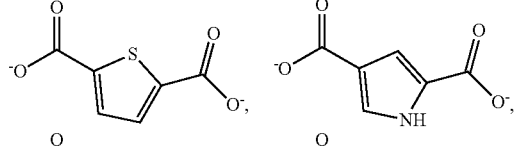
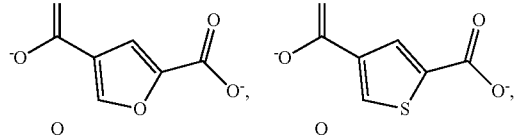
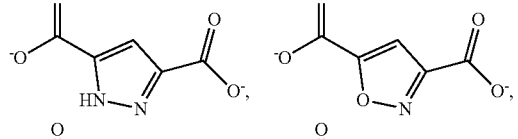
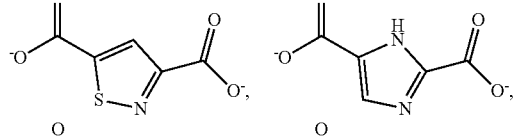
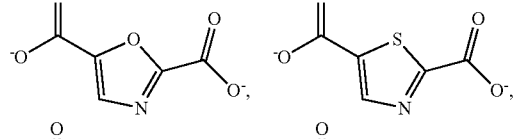
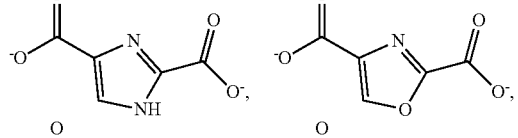
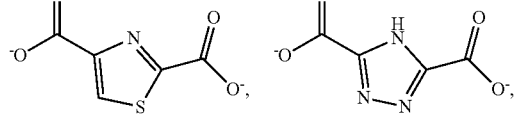

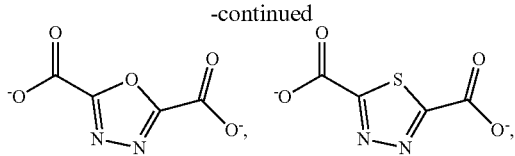
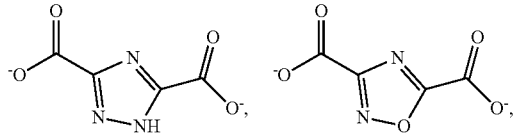
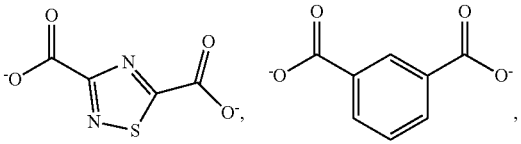
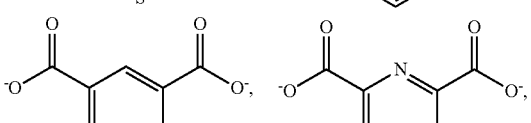
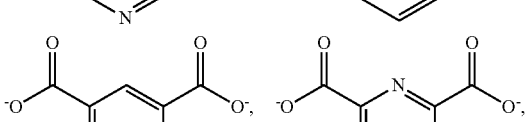
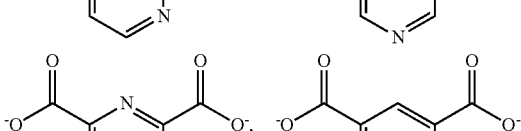
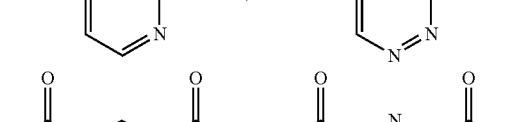
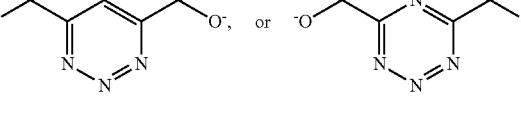

19. The MOF of embodiment 11 or 12, wherein the organic ligands comprise one or more moieties:

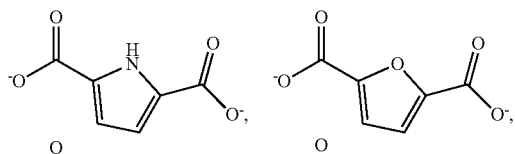
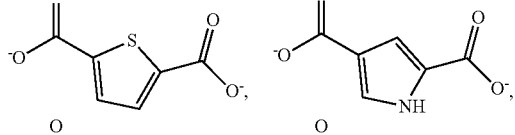
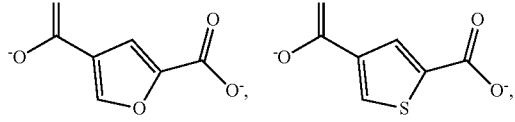

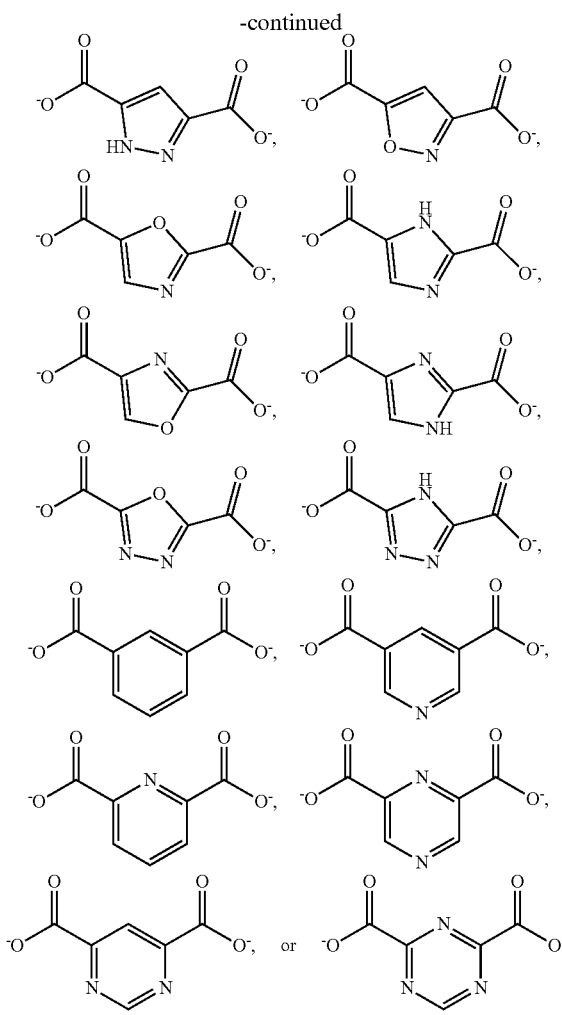

20. The MOF of embodiment 11 or 12, wherein the organic ligands comprise one or more moieties:

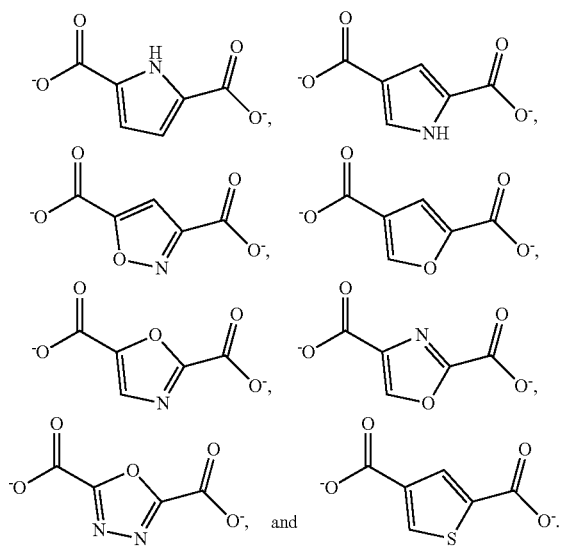

21. The MOFs of any one of embodiments 18 to 20, wherein the organic ligands comprise one moiety.

22. The MOFs of any one of embodiments 18 to 20, wherein the organic ligands comprise two moieties.

23. The MOFs of any one of embodiments 18 to 20, wherein the organic ligands comprise a plurality of moieties.

24. The MOF of any one of embodiments 11 to 17, wherein each organic ligand comprises one moiety of Formula (I)-(XII), and the MOF is a single-linker metal-organic framework.

25. The MOF of embodiment 24, wherein each organic ligand comprises one moiety of Formula (T)-(VII), and the MOF is a single-linker metal-organic framework.

26. The MOF of embodiment 24 wherein each organic ligand comprises:

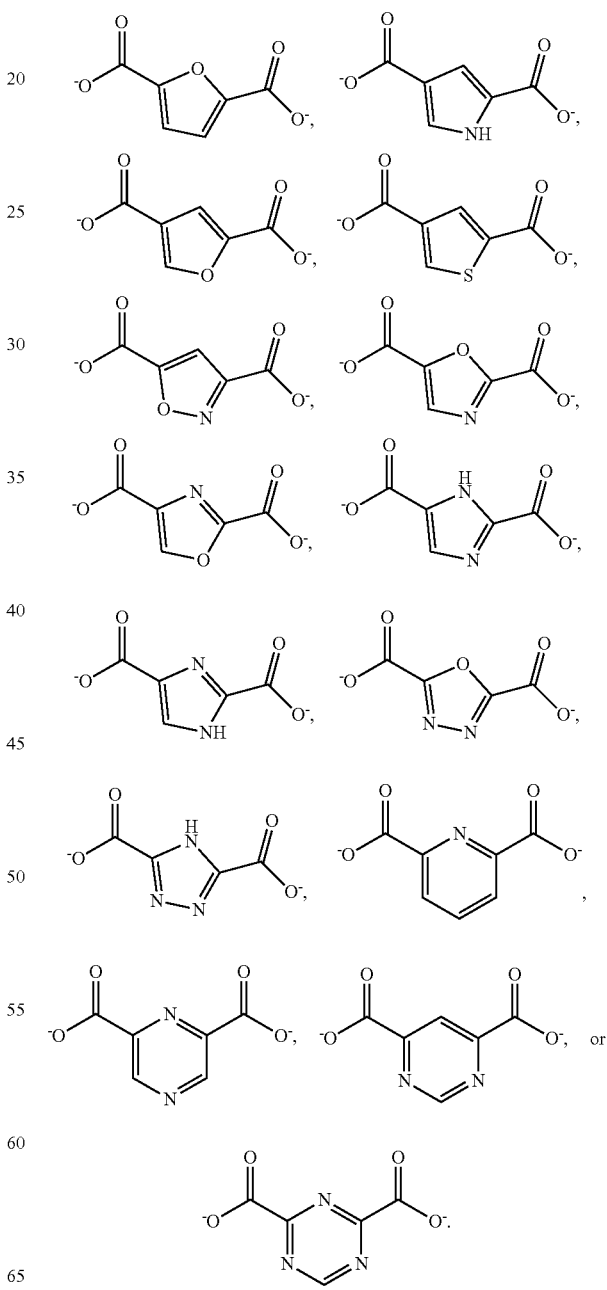

27. The MOF of embodiment 24, wherein each organic ligand comprises

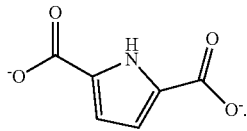

28. The MOF of embodiment 27, wherein each secondary building unit comprises aluminum hydroxide.
29. The MOF of embodiment 28, wherein the MOF is MOF-313.
30. The MOF of embodiment 24, wherein each organic ligand comprises

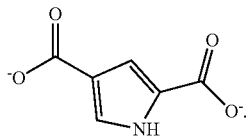

31. The MOF of embodiment 30, wherein each secondary building unit comprises aluminum hydroxide.
32. The MOF of embodiment 31, wherein the MOF is MOF-314.
33. The MOF of embodiment 24, wherein each organic ligand comprise

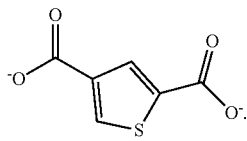

34. The MOF of embodiment 33, wherein each secondary building unit comprises aluminum hydroxide.
35. The MOF of embodiment 34, wherein the MOF is MOF-323.
36. The MOF of any one of embodiments 11 to 20, wherein the MOF is a multivariate metal-organic framework (MTV-MOF).
37. The MOF of embodiment 36, wherein the organic ligands comprises a plurality of moieties of Formula (I)-(VII).
38. The MOF of embodiment 36, wherein the organic ligands comprises two moieties of Formula (I)-(VII).
39. The MOF of embodiment 36, wherein the organic ligands comprises a plurality of moieties of Formula (I)-(XII).
40. The MOF of embodiment 36, wherein the organic ligands comprises two moieties of Formula (I)-(XII).
41. The MOF of embodiment 36, wherein the organic ligands comprise

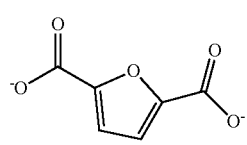

and

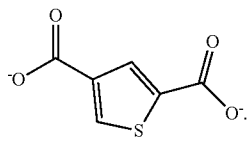

42. The MOF of embodiment 41, wherein each secondary building unit comprises aluminum hydroxide.
43. The MOF of embodiment 42, wherein the MOF is Al(OH)(2,5-FDC)(2,4-TDC); or Al(OH)(2,5-FDC)$_w$(2,4-TDC)$_v$, wherein w+v=1; or Al(OH)(2,5-FDC)$_{0.5}$(2,4-TDC)$_{0.5}$.
44. The MOF of embodiment 36, wherein the organic ligands comprise

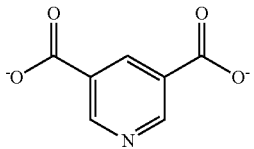

and

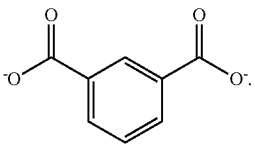

45. The MOF of embodiment 44, wherein each secondary building unit comprises aluminum hydroxide.
46. The MOF of embodiment 45, wherein the MOF is Al(OH)(3,5-PynDC)(IPA), or optionally Al(OH)(3,5-PynDC)$_m$(IPA)$_n$, wherein m+n=I; or Al(OH)(3,5-PynDC)$_{0.56}$(IPA)$_{0.44}$.
47. The MOF of any one of embodiments 1 to 46, wherein each secondary building unit comprises zirconium, nickel, iron, copper, manganese, aluminum, magnesium, calcium, strontium, barium, titanium, zinc, indium, cadmium, hafnium, lead, cobalt, or chromium, or a complex thereof.
48. The MOF of any one of embodiments 11 to 47, wherein each secondary building unit comprises aluminum or an aluminum-containing complex.
49. The MOF of any one of embodiments 11 to 48, wherein the secondary building units form 1D rod-like chains, and the organic ligands comprise one or more v-shaped ditopic moieties.
50. The MOF of embodiment 49, wherein the secondary building units are connected to the organic ligands through the oxygen atoms of the carboxylate groups in the organic ligands via a cis-edge-shared octahedra geometry or a trans-edge-shared octahedra geometry.
51. A method of water harvesting, comprising:
   adsorbing water from ambient atmosphere using a water-harvesting system, wherein the water-harvesting system comprises one or more MOFs of any one of embodiments 11 to 50;
   desorbing vapor from the one or more MOFs: and
   collecting water from the vapor.

52. The method of embodiment 51, wherein the water is collected from the vapor using a condenser.
53. A water harvesting system, comprising an adsorbent layer comprising one or more MOFs of any one of embodiments 11 to 50.
54. The system of embodiment 53, further comprising a condenser adjacent to the adsorbent layer.
55. The system of embodiment 53, wherein the system is a passive water harvesting system.
56. A MOF of any one of embodiments 11 to 50 for use in water harvesting or water purification.
57. A MOF of any one of embodiments 11 to 50 for use in heat pumps, dehumidifiers, adsorption refrigerators, solar cooling systems, dryers, organic light emitting devices, or secondary battery devices.
58. A method of using the MOF of any one of embodiments 11 to 50, comprising containing in, storing in and/or extracting from the MOF a predetermined gas or fluid.
59. The method of embodiment 58, wherein the gas or fluid is $CO_2$, $H_2O$, $H_2$, $CH_4$, $C_2H_4$, or $C_2H_2$, or any combinations thereof.

EXAMPLES

The following Examples are merely illustrative and are not meant to limit any aspects of the present disclosure in any way.

Example 1

Synthesis and Characterization of MOF-313

Figure 2:
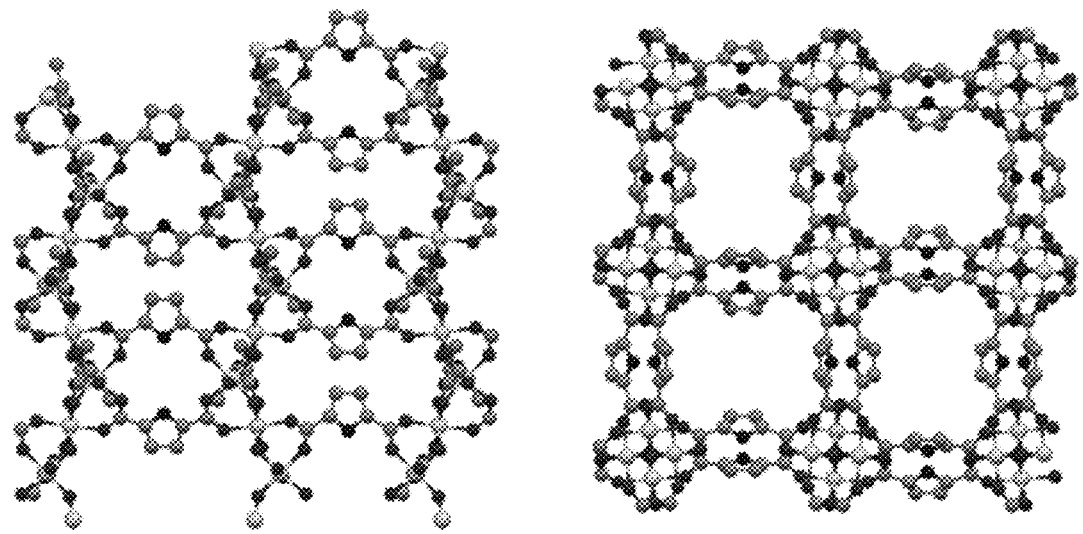
FIGS. 2 and 3 depict a structural model of Al(OH)(2,5-PylDC).
Figure 3:
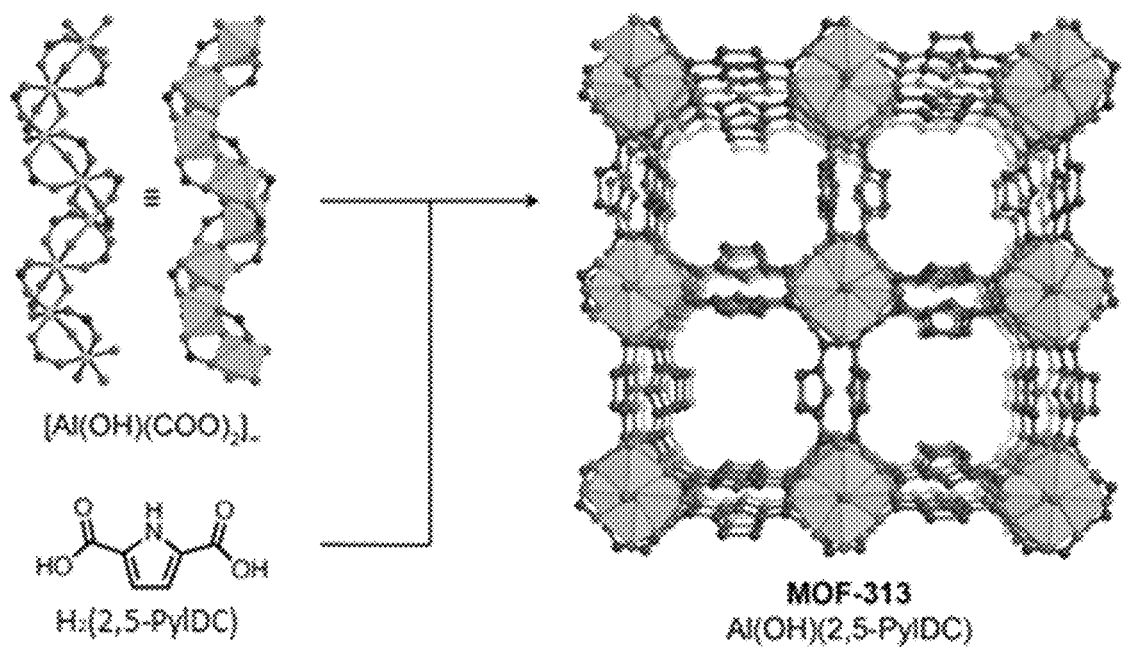
Figure 4:
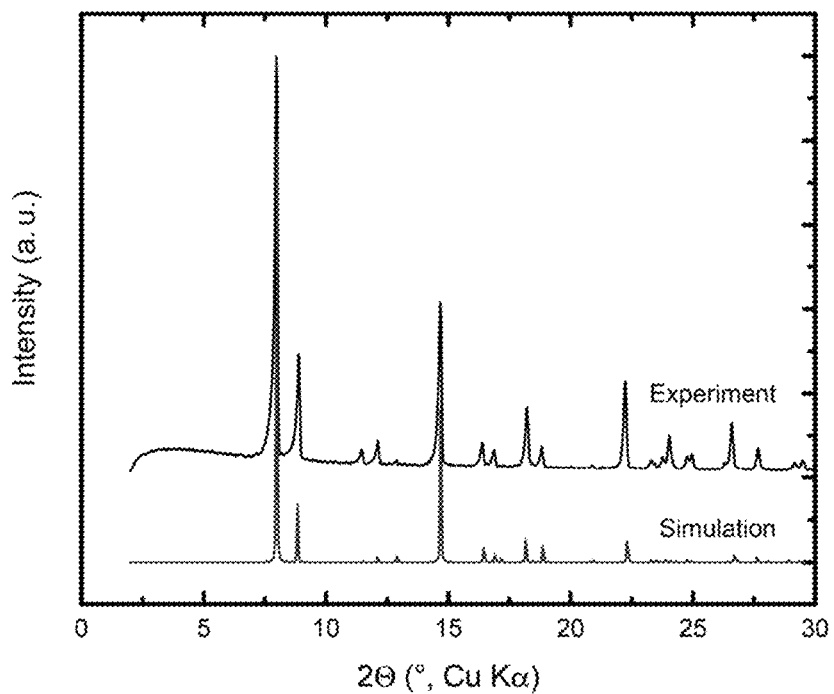
FIG. 4 depicts a comparison of the powder x-ray diffraction (PXRD) data of the experimentally attained MOF Al(OH)(2,5-PylDC) and its proposed structural model.
Figure 5:
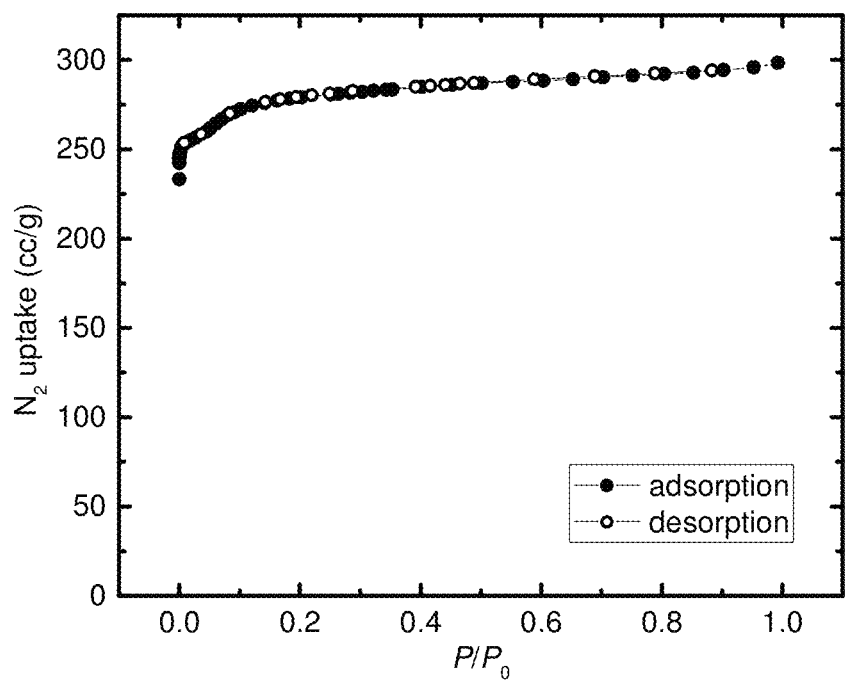
FIG. 5 depicts a nitrogen sorption analysis on Al(OH)(2,5-PylDC) conducted at 77 K (BET surface area=1051 m$^2$/g).
Figure 6:
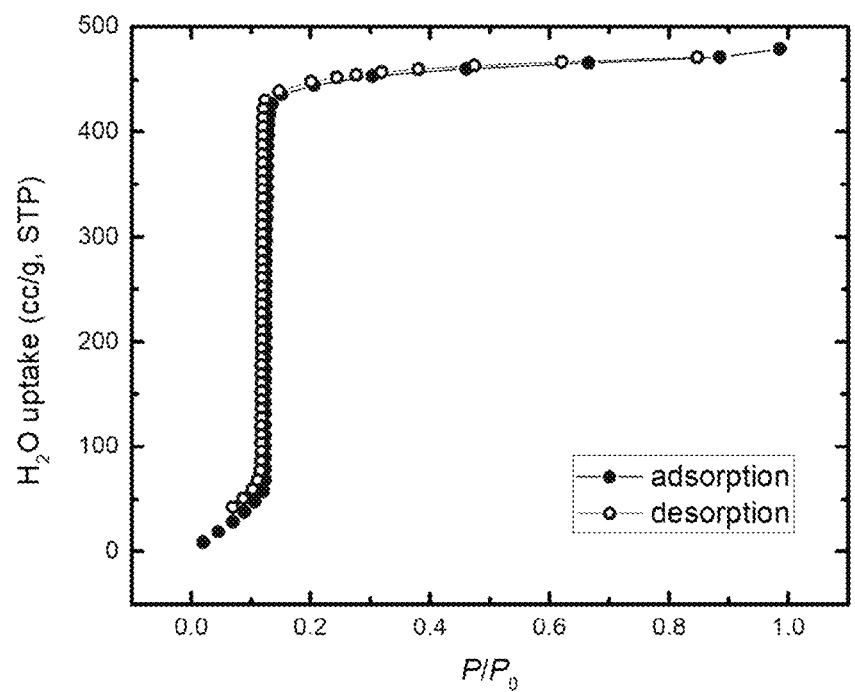
FIG. 6 depicts a water sorption isotherm of Al(OH)(2,5-PylDC) conducted at 25° C.

To illustrate an exemplary way to synthesize 1D rod-like SBU based MOFs, the synthesis and characterization of Al(OH)(2,5-PylDC) (2,5-PylDC=2,5-pyrroledicarboxylate), a MOF suitable for water sorption applications, is described here. This compound is also referred to as MOF-313.
Synthesis:
77.5 mg of 2,5-pyrroledicarboxylic acid (0.5 mmol) was dissolved in 4.5 mL aqueous NaOH solution (0.139 M) under heating. Then, 500 μL aqueous $AlCl_3$ solution (1 M) was added. The resulting precipitation was dissolved under heating and the solution was placed in an oven preheated to 100° C. After two hours, the precipitation was filtrated off. The solid was washed five times with water for one day, and five times with methanol for another day. Removal of the solvent under reduced pressure resulted in 15 mg Al(OH)(2,5-PylDC).
PXRD Characterization:
The structure (FIGS. 2 and 3) of the synthesized MOF was verified based on powder x-ray diffraction (PXRD) analysis (FIG. 4). The structure was shown to be constructed from 1D rod-like SBUs connected by 2,5-pyrroledicarboxylate linker ligands.
Porosity and Surface Area:
In order to analyze the porosity and surface area of the metal-organic framework, a nitrogen isotherm at 77 K was collected (FIG. 5). Based on the BET model, the surface area was estimated to be 1051 m$^2$/g.
Water Sorption Properties:
The water sorption isotherm exhibited a steep step at $P/P_0=0.12$ (FIG. 6). Water vapor uptake started to level off at $P/P_0=0.15$ and reached approximately 480 cm$^3$/g (STP) at full saturation of the material. Importantly, only minimal or in the optimal case no hysteresis was observed.

Example 2

Synthesis and Characterization of MOF-314

Figure 7:
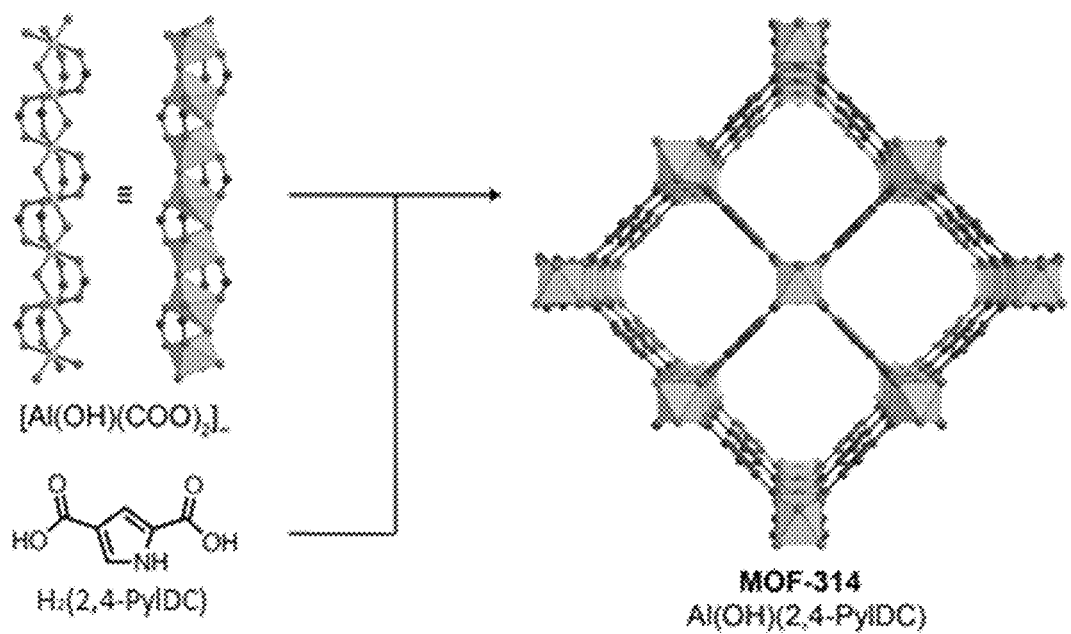
FIG. 7 depicts a structural model of Al(OH)(2,4-PylDC): view along the a-axis (left) and c-axis (right). Oxygen atoms are located at the vertices of the octahedron, coordinating to an aluminum atom at the center of the octahedron.
Figure 8:
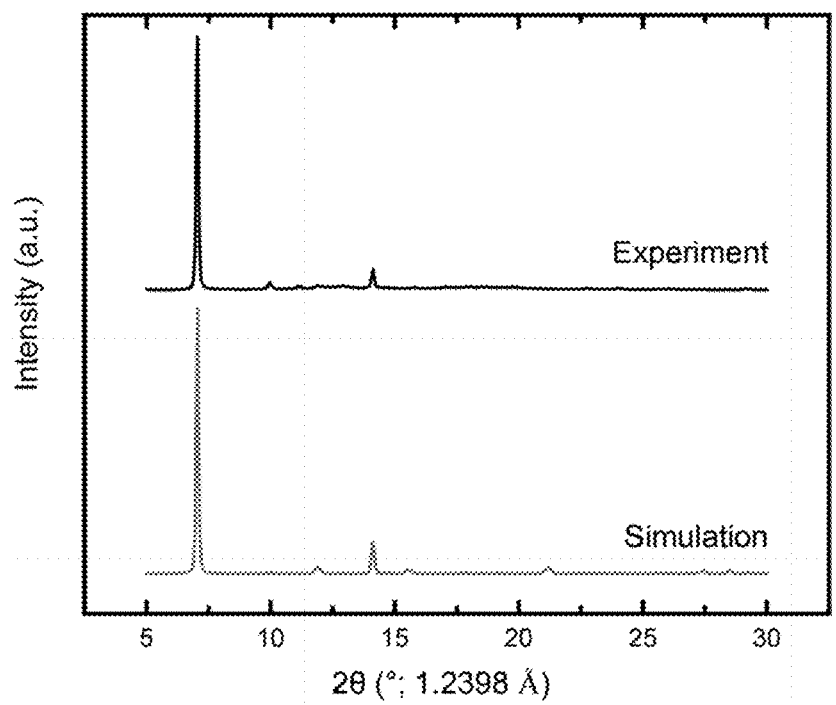
FIG. 8 depicts a comparison of the powder x-ray diffraction (PXRD) data of the experimentally attained MOF Al(OH)(2,4-PylDC) and its proposed structural model.
Figure 9:
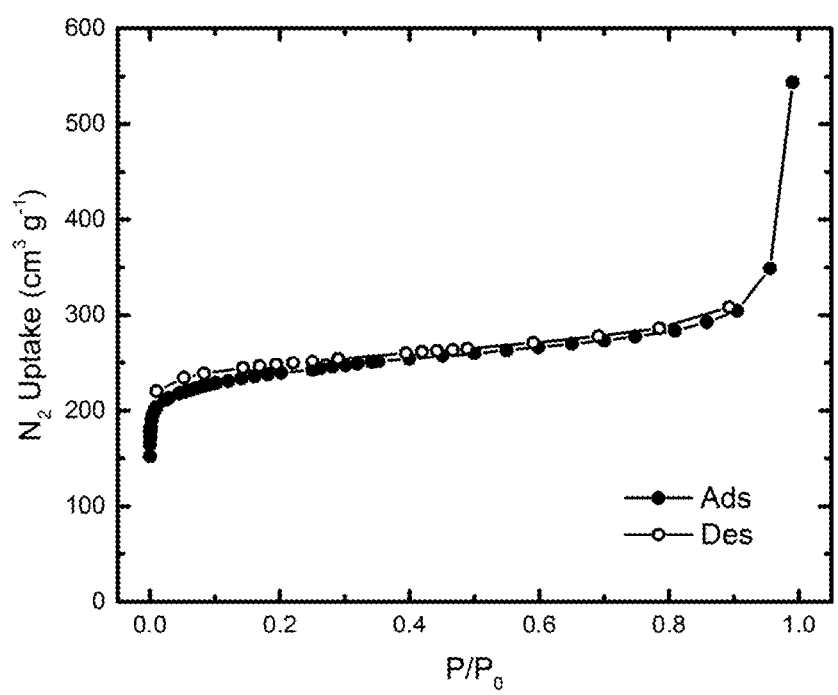
FIG. 9 depicts a nitrogen sorption analysis on Al(OH)(2,4-PylDC) conducted at 77 K (BET surface area=912 m$^2$/g).
Figure 10:
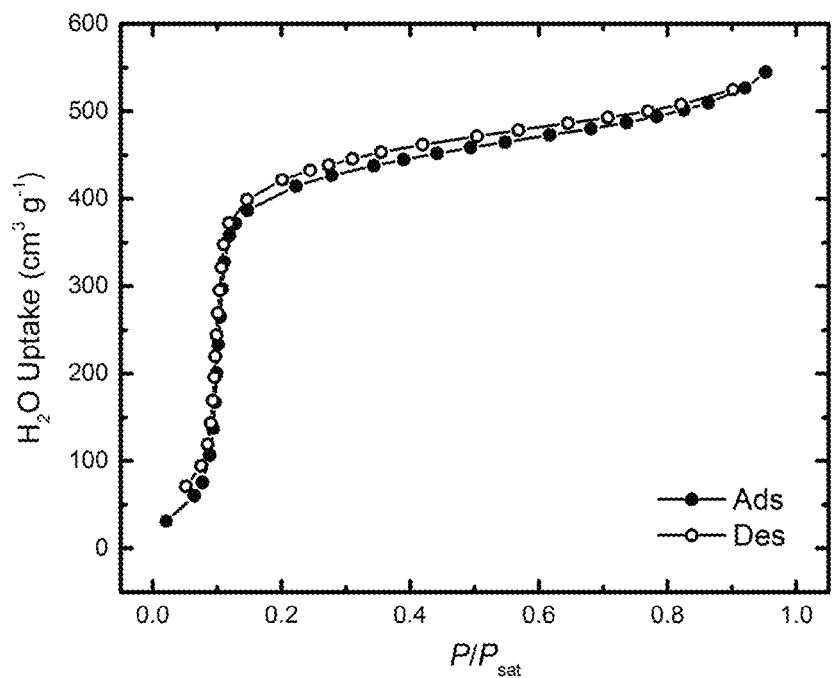
FIG. 10 depicts a water sorption isotherm of Al(OH)(2,4-PylDC) conducted at 25° C.

To illustrate an exemplary way to synthesize 1D rod-like SBU based MOFs, the synthesis and characterization of Al(OH)(2,4-PylDC) (2,4-PylDC=2,4-pyrroledicarboxylate), a MOF suitable for water sorption applications, is described here. This compound is also referred to as MOF-314.
Synthesis:
2,4-pyrroledicarboxylic acid [$H_2$(2,4-PylDC); 75.0 mg) was completely dissolved in aqueous NaOH solution (0.43 M, 14.517 mL). Then, aqueous $AlCl_3$ solution (1M, 0.483 mL) was added which resulted in white precipitation. The resulting suspension was heated to 100° C. in a pre-heated oven and the solution became clear after a few minutes. The reaction was stopped after 6 hours. The resulting off-white solid was filtered and washed three times with $H_2O$ and three times with methanol over a period of one day each. After heating at 120° C. under vacuum (~10$^3$ mbar) for 6 hours, activated MOF-314 [Al(OH)(2,4-PylDC); 35 mg) was obtained.
PXRD Characterization:
The structure (FIG. 7) of the synthesized MOF was verified based on powder x-ray diffraction (PXRD) analysis (FIG. 8). The structure was shown to be constructed from 1D rod-like SBUs connected by 2,4-pyrroledicarboxylate linker ligands.
Porosity and Surface Area:
In order to analyze the porosity and surface area of the metal-organic framework, a nitrogen isotherm at 77 K was collected (FIG. 9). Based on the BET model, the surface area was estimated to be 912 m$^2$/g.
Water Sorption Properties:
The water sorption isotherm exhibited a steep step at $P/P_0=0.1$ (FIG. 10). Water vapor uptake started to level off at $P/P_0=0.2$ and reached approximately 535 cm$^3$/g (STP) at full saturation of the material. Importantly, only minimal or in the optimal case no hysteresis was observed.

Example 3

Synthesis and Characterization of MOF-323

Figure 11:
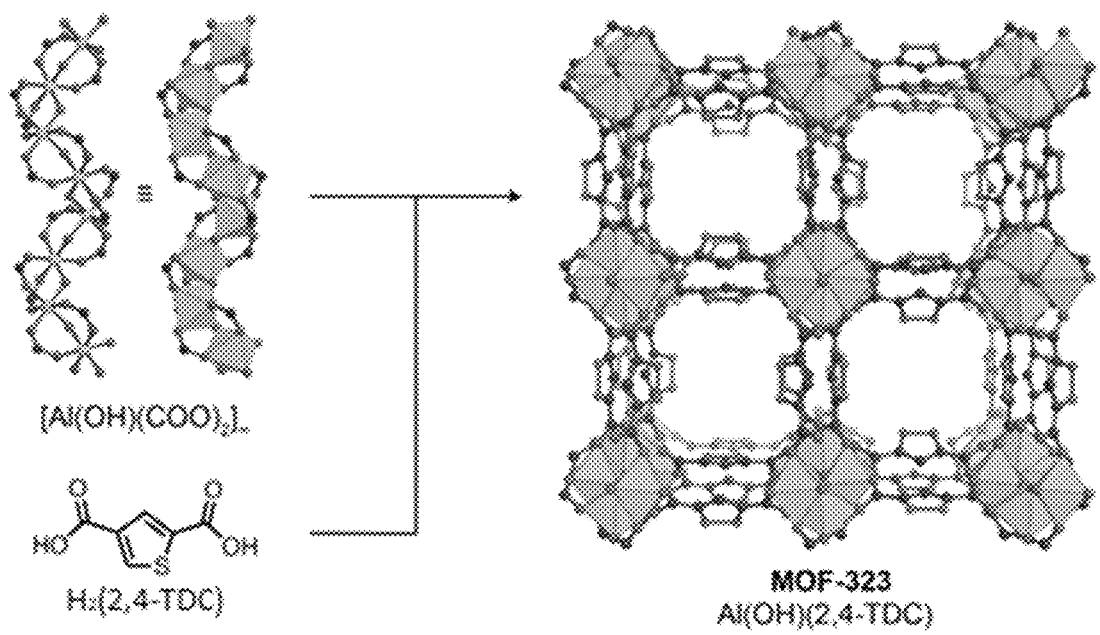
FIG. 11 depicts a structural model of Al(OH)(2,4-TDC): view along the a-axis (left) and c-axis (right). Oxygen atoms are located at the vertices of the octahedron, coordinating to an aluminum atom at the center of the octahedron.
Figure 12:
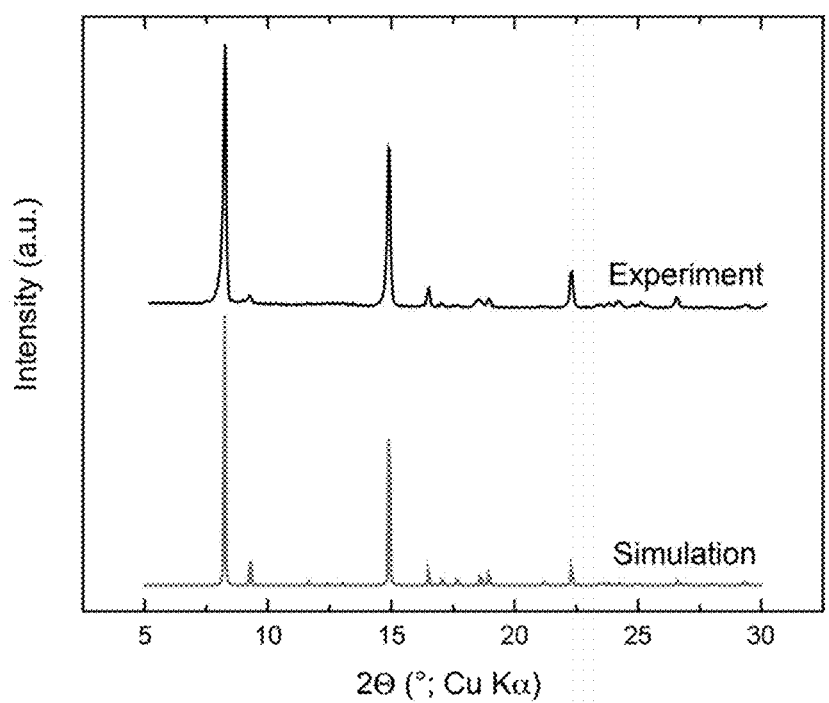
FIG. 12 depicts a comparison of the powder x-ray diffraction (PXRD) data of the experimentally attained MOF Al(OH)(2,4-TDC) and its proposed structural model.

To illustrate an exemplary way to synthesize 1D rod-like SBU based MOFs, the synthesis and characterization of Al(OH)(2,4-TDC) (2,4-TDC=2,4-thiophenedicarboxylate), a MOF suitable for water sorption applications, is described here. This compound is also referred to as MOF-323.
Synthesis:
2,4-thiophenedicarboxylic acid ($H_2$(2,4-TDC); 98.9 mg) was dissolved in KOH solution (0.139 M, 6.187 mL) and ethanol (3.239 mL). Then, aqueous $AlCl_3$ solution (1 M, 0.574 mL) was added. The resulting clear solution was heated to 100° C. in a pre-heated oven. After 24 hours, the resulting white precipitation was filtered and washed three times with $H_2O$ and three times with methanol over a period of one day each. After heating at 60° C. under vacuum (~10$^3$ mbar) for 6 hours, activated MOF-323 (Al(OH)(2,4-TDC); 60 mg) was obtained.
PXRD Characterization:
The structure (FIG. 11) of the synthesized MOF was verified based on powder x-ray diffraction (PXRD) analysis (FIG. 12). The structure was shown to be constructed from 1D rod-like SBUs connected by 2,4-thiophenedicarboxylate linker ligands.

Figure 13:
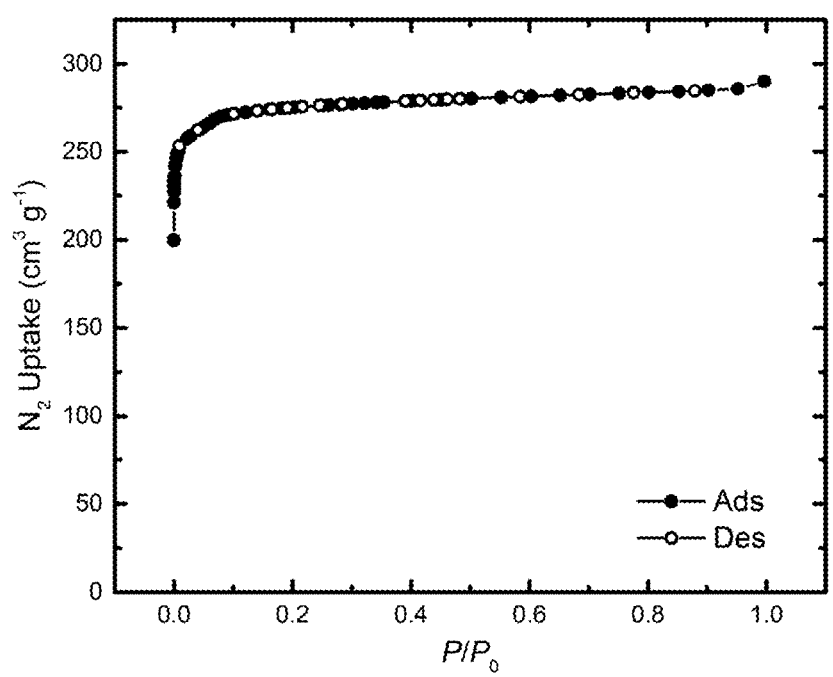
FIG. 13 depicts a nitrogen sorption analysis on Al(OH)(2,4-TDC) conducted at 77 K (BET surface area=1101 m$^2$/g).

Porosity and Surface Area:

In order to analyze the porosity and surface area of the metal-organic framework, a nitrogen isotherm at 77 K was collected (FIG. 13). Based on the BET model, the surface area was estimated to be 1101 m$^2$/g.

Figure 14:
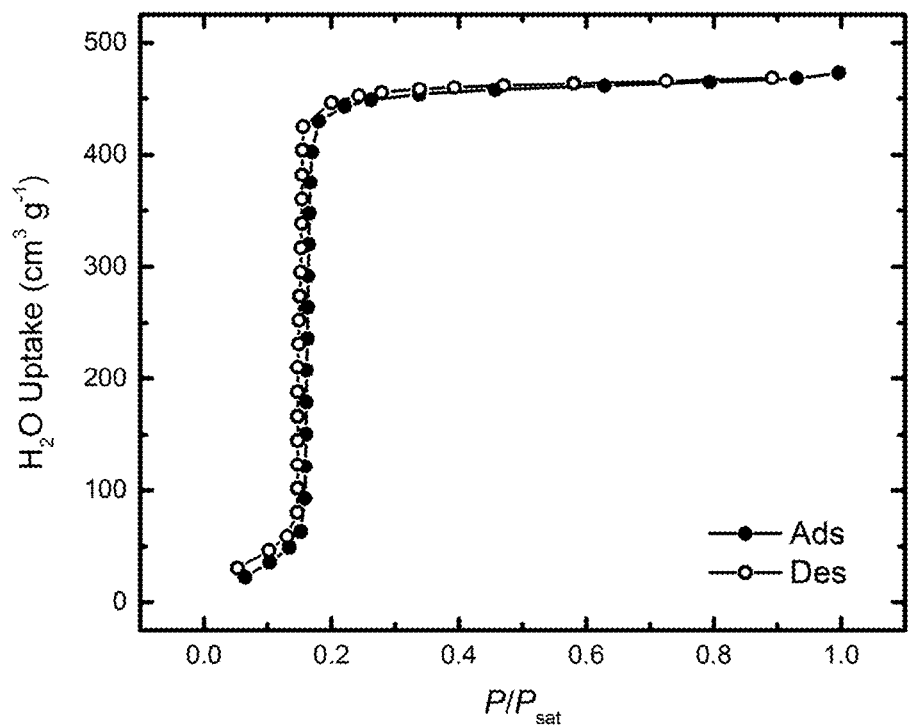
FIG. 14 depicts a water sorption isotherm of Al(OH)(2,4-TDC) conducted at 25° C.

Water Sorption Properties:

The water sorption isotherm exhibited a steep step at P/P$_0$=0.16 (FIG. 14). Water vapor uptake started to level off at P/P$_0$=0.21 and reached approximately 470 cm$^3$/g (STP) at full saturation of the material. Importantly, only minimal or in the optimal case no hysteresis was observed.

Example 4

Synthesis and Characterization of MTV-MOF

Figure 15:
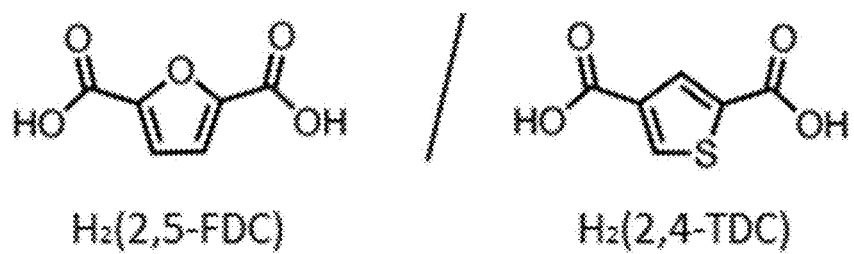
FIG. 15 depicts chemical structures of 2,5-furandicarboxylic acid (H$_2$(2,5-FDC)) and 2,4-thiophenedicarboxylic acid (H$_2$(2,4-TDC)).

To illustrate an exemplary way to synthesize an exemplary MTV-MOF system, the synthesis and characterization of Al(OH)(2,5-FDC)$_{0.5}$(2,4-TDC)$_{0.5}$ (2,5-FDC=2,5-furandicarboxylate; 2,4-TDC=2,4-thiophenedicarboxylate; FIG. 15), a MTV-MOF suitable for water sorption applications, is described here.

Synthesis of the MTV-MOF:

2,5-furandicarboxylic acid (H$_2$(2,5-FDC); 44.9 mg) and 2,4-thiophenedicarboxylic acid (H$_2$(2,4-TDC); 49.5 mg) were dissolved in aqueous KOH solution (0.139 M, 6.187 mL) and ethanol (3.239 mL) (FIG. 15). Then, aqueous AlCl$_3$ solution (1 M, 0.574 mL) was added. The resulting solution was heated to 100° C. in a pre-heated oven. After 24 hours, the resulting white precipitation was filtered and washed three times with H$_2$O and three times with methanol over a period of one day each. After heating at 120° C. under vacuum (~10$^3$ mbar) for 6 hours, the activated MTV-MOF Al(OH)(2,5-FDC)$_{0.5}$(2,4-TDC)$_{0.5}$ (35 mg) was obtained.

Synthesis of the Single-Linker MOFs Used for Comparison:

Al(OH)(2,5-FDC) (also known as MIL-160) was synthesized by dissolving H$_2$(2,5-FDC) (78.0 mg) in aqueous KOH solution (0.079 M, 9.5 mL) and adding aqueous AlCl$_3$ solution (1 M, 0.5 mL). The resulting solution was heated at 100° C. overnight. The resulting white precipitation was filtered and washed three times with H$_2$O and three times with methanol over a period of one day each. After heating at 120° C. under vacuum (~10$^3$ mbar) for 6 hours, activated Al(OH)(2,5-FDC) (40 mg) was obtained. Al(OH)(2,4-TDC) (MOF-323) was synthesized as described above.

Figure 16:
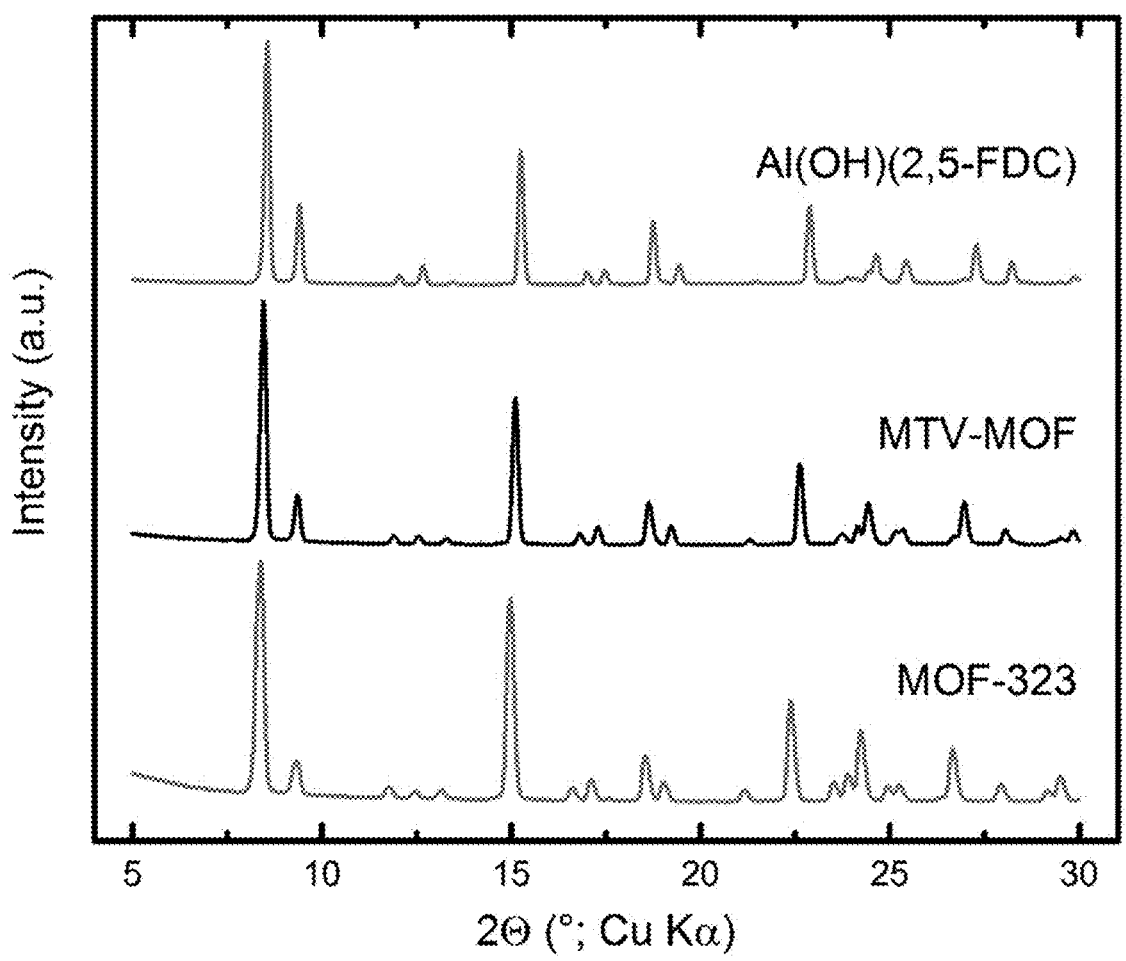
FIG. 16 depicts a comparison of the powder X-ray diffraction (PXRD) analyses conducted on Al(OH)(2,5-FDC), MTV-MOF Al(OH)(2,5-FDC)$_{0.5}$(2,4-TDC)$_{0.5}$, and MOF-323.

PXRD Characterization:

The synthesized MTV-MOF was verified based on powder x-ray diffraction (PXRD) analysis, and compared with Al(OH)(2,5-FDC) and MOF-323 (FIG. 16).

Figure 17:
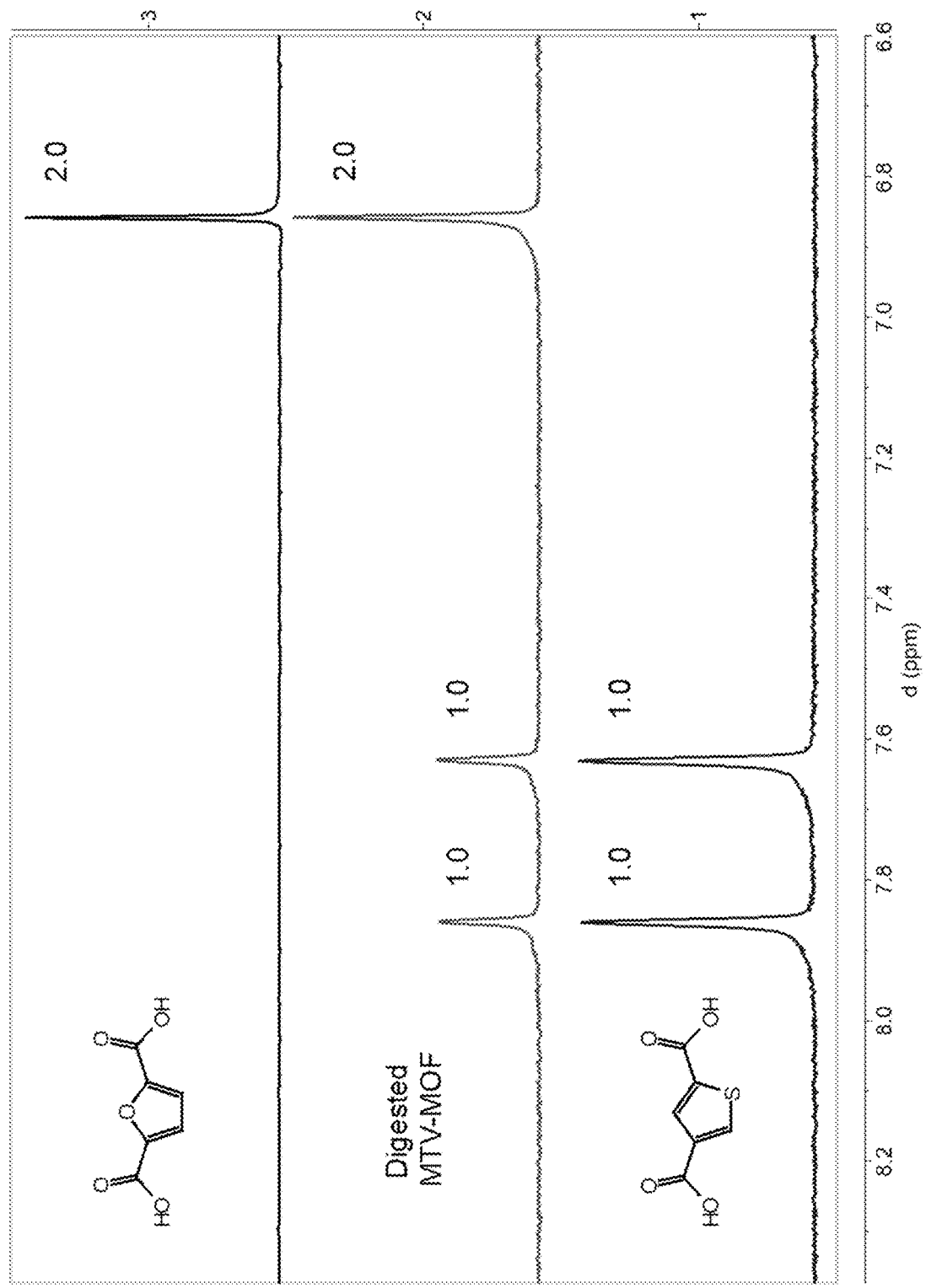
FIG. 17 depicts a $^1$H-nuclear magnetic resonance (NMR) analysis conducted on the linkers H$_2$(2,5-FDC) (top) and H$_2$(2,4-TDC) (bottom), as well as on the digested (i.e., treated as described in Example 4 below) MTV-MOF Al(OH)(2,5-FDC)$_{0.5}$(2,4-TDC)$_{0.5}$ (center). Numbers indicate the relative signal intensities of the respective peaks determined through integration.

NMR Analysis:

Washed and activated samples were subjected to NaOD solution (5% in D$_2$O) prior to nuclear magnetic resonance (NMR) analysis. Under these conditions, the aluminum MTV-MOF dissolved into its components, and solution-based $^1$H-NMR analysis was employed to analyze its linker molecule composition (FIG. 17).

Figure 18:
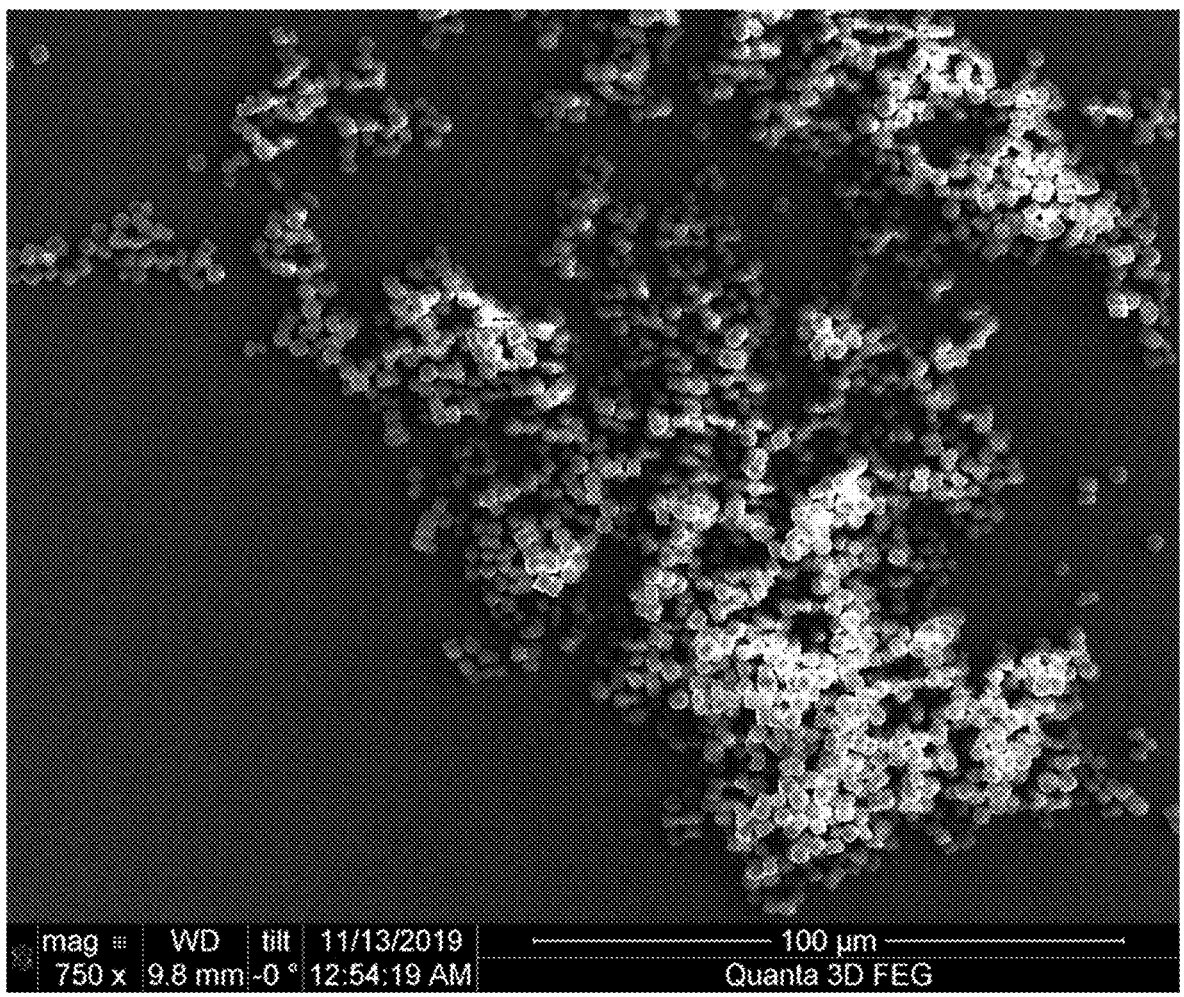
FIG. 18 depicts a representative scanning electron microscopy (SEM) micrograph of the MTV-MOF Al(OH)(2,5-FDC)$_{0.5}$(2,4-TDC)$_{0.5}$.
Figure 19A:
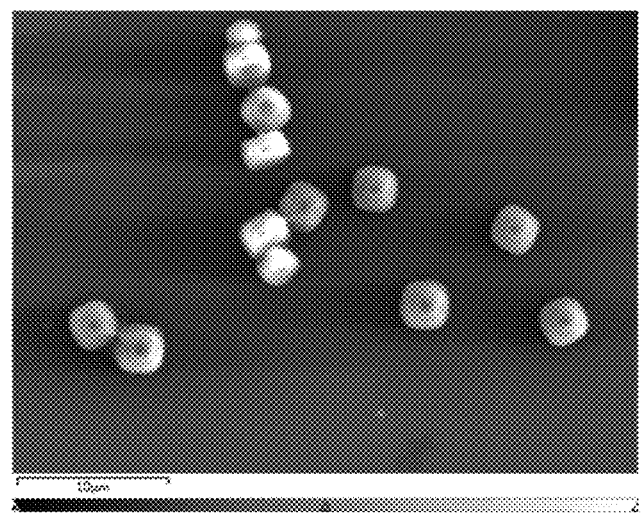
FIGS. 19A-E depict various representative scanning electron microscopy (SEM) micrographs and energy dispersive X-ray spectroscopy (EDS) analyses of the MTV-MOF Al(OH)(2,5-FDC)$_{0.5}$(2,4-TDC)$_{0.5}$.
Figure 19B:
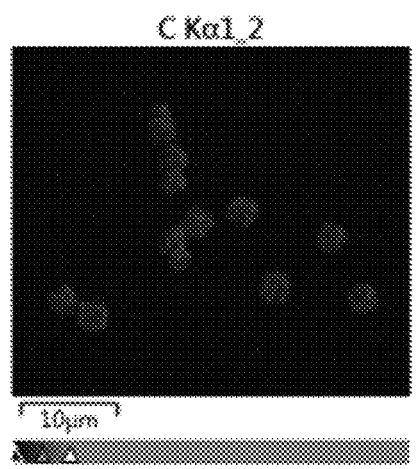
Figure 19C:
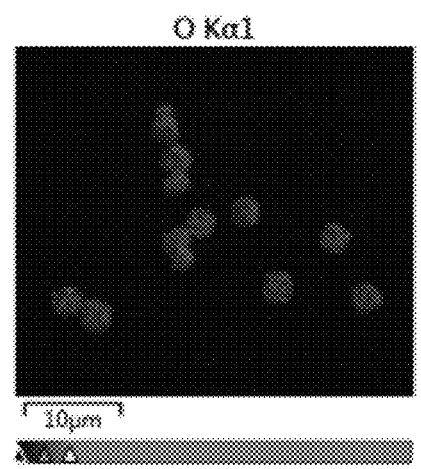
Figure 19D:
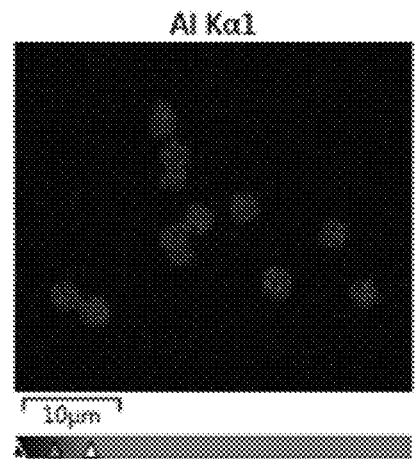
Figure 19E:
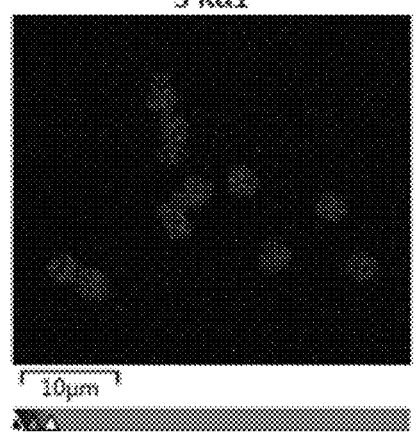

Scanning Electron Microscopy (SFM) Micrograph:

The overall crystal shape and morphology in an SEM micrograph of the MTV-MOF Al(OH)(2,5-FDC)$_{0.5}$(2,4-TDC)$_{0.5}$ (FIG. 18) indicated phase-purity.

Scanning Electron Microscopy (SEM) Micrograph and Energy Dispersive X-Ray Spectroscopy (EDS) Analysis:

An SEM micrograph and EDS analysis of the MTV-MOF Al(OH)(2,5-FDC)$_{0.5}$(2,4-TDC)$_{0.5}$ (FIGS. 19A-E) indicated even distribution of the elements carbon (C), oxygen (O), aluminum (Al), and sulfur (S) in all crystals. Together with the NMR data, this indicated that both linkers are present and evenly distributed in all crystals.

Figure 20:
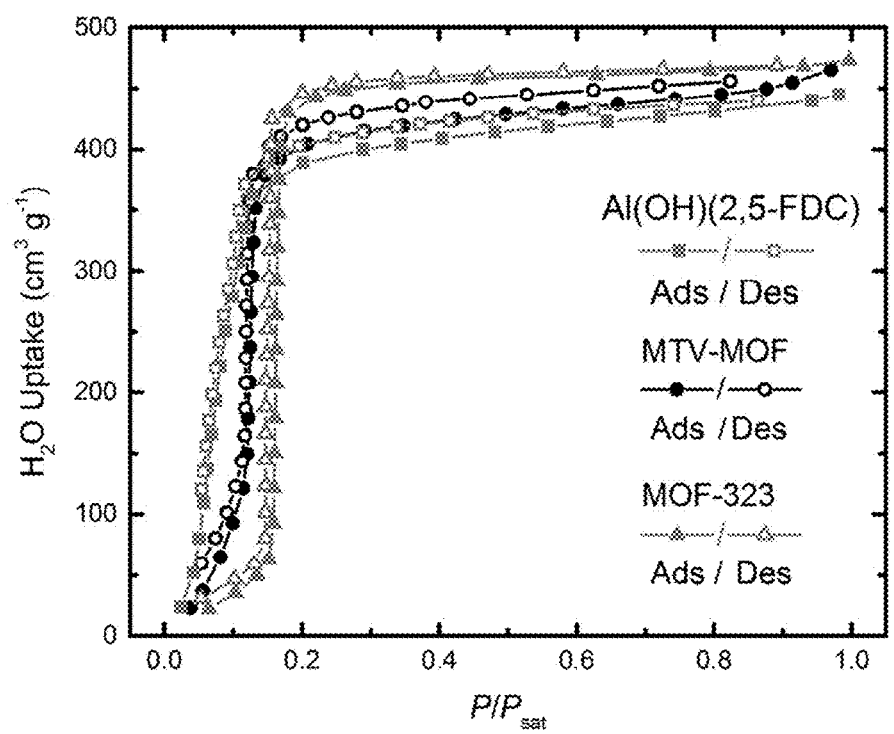
FIG. 20 depicts a water sorption analyses on Al(OH)(2,5-FDC), the MTV-MOF Al(OH)(2,5-FDC)$_{0.5}$(2,4-TDC)$_{0.5}$, and MOF-323 at 25° C. (P: partial vapor pressure, P$_{sat}$: saturation vapor pressure at 25° C.).
Figure 21:
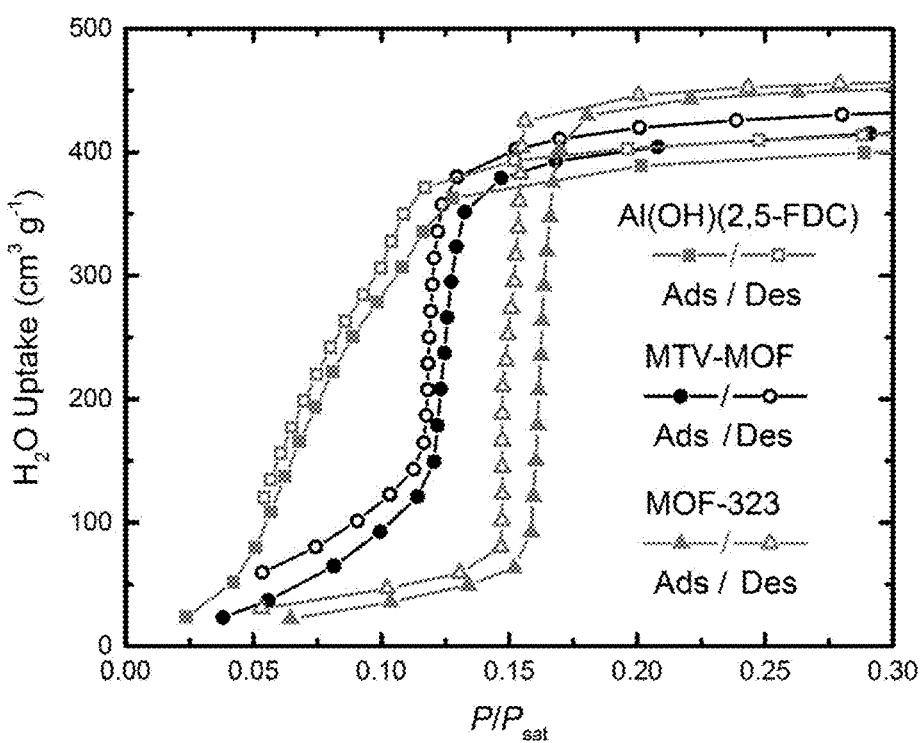
FIG. 21 depicts a low pressure region of the water sorption analyses on Al(OH)(2,5-FDC), the MTV-MOF Al(OH)(2,5-FDC)$_{0.5}$(2,4-TDC)$_{0.5}$, and MOF-323 at 25° C. (P: partial vapor pressure, Pw: saturation vapor pressure at 25° C.).

Water Sorption Properties:

Water sorption analyses on Al(OH)(2,5-FDC), the MTV-MOF Al(OH)(2,5-FDC)$_{0.5}$(2,4-TDC)$_{0.5}$, and MOF-323 at 25° C. (FIGS. 20 and 21) indicated that MTV-systems can be used to tune the water sorption properties of MOFs.

Example 5

Synthesis and Characterization of MTV-MOF

Figure 22:
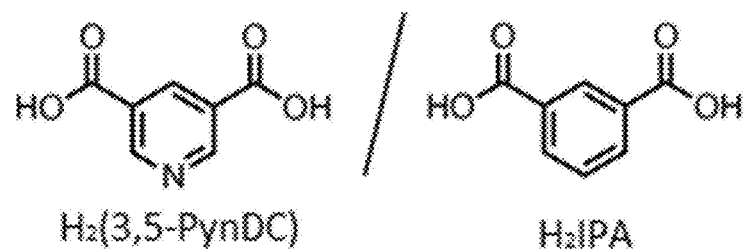
FIG. 22 depicts chemical structures of Isophthalic acid (H$_2$IPA) and 3,5-pyridinedicarboxylic acid (H$_2$(3,5-PynDC)).

To illustrate an exemplary way to synthesize another exemplary MTV-MOF system, the synthesis and characterization of Al(OH)(3,5-PynDC)$_{0.56}$(IPA)$_{0.44}$ (3,5-PynDC=3,5-pyridinedicarboxylate; IPA=isophthalate; FIG. 22), a MTV-MOF suitable for water sorption applications, is described here.

Synthesis of the MIV-MOF:

Isophthalic acid (H$_2$IPA; 41.5 mg) and 3,5-pyridinedicarboxylic acid (H$_2$(3,5-PynDC); 41.8 mg) were dissolved in H$_2$O (4 mL) and ethanol (5 mL) (FIG. 22). Then, aqueous AlCl$_3$ (1 M, 0.5 mL) and aqueous urea solution (2 M, 0.5 mL) were added. The resulting solution was heated to 100° C. in a pre-heated oven. After 24 hours, the resulting white precipitation was filtered and washed three times with H$_2$O and three times with methanol over a period of one day each. After heating at 120° C. under vacuum (~10$^3$ mbar) for 6 hours, the activated MTV-MOF Al(OH)(3,5-PynDC)$_{0.56}$(IPA)$_{0.44}$ (70 mg) was obtained.

Synthesis of the Single-Linker MOFs Used for Comparison:

To synthesize Al(OH)(3,5-PynDC) (also known as CAU-10-pyridine), 3,5-pyridinedicarboxylic acid (H$_2$(3,5-PynDC); 83.5 mg) was dissolved in H$_2$O (4 mL) and ethanol (5 mL). Then, aqueous AlCl$_3$ (1 M, 0.5 mL) and aqueous urea solution (2 M, 0.5 mL) was added. The resulting solution was heated to 100° C. in a pre-heated oven. After 24 hours, the resulting white precipitation was filtered and washed three times with H$_2$O and three times with methanol over a period of one day each. After heating at 120° C. under vacuum (~10$^3$ mbar) for 6 hours, Al(OH)(3,5-PynDC) (70 mg) was obtained. Al(OH)IPA (also known as CAU-10) was synthesized based on a previously reported procedure.[16]

Figure 23:
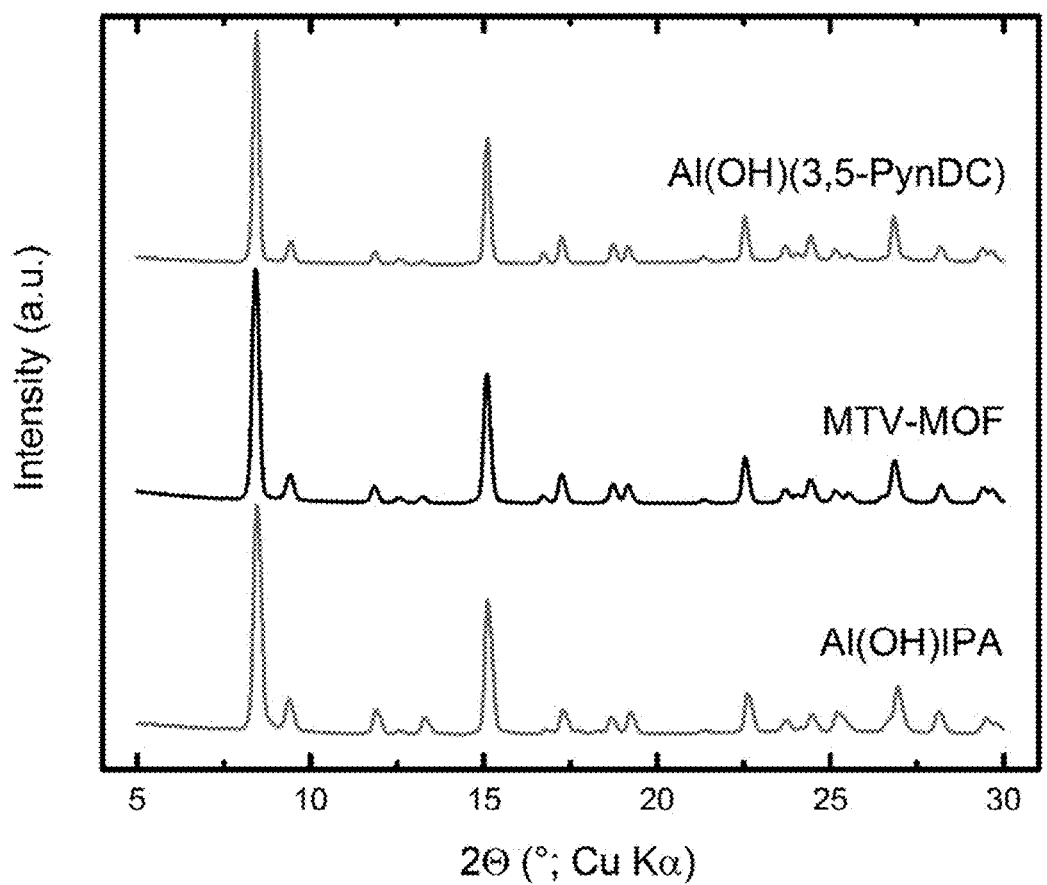
FIG. 23 depicts a comparison of the powder X-ray diffraction (PXRD) analyses conducted on Al(OH)(3,5-PynDC), the MTV-MOF Al(OH)(3,5-PynDC)$_{0.56}$(IPA)$_{0.44}$, and Al(OH)IPA.

PXRD Characterization:

The synthesized MTV-MOF was verified based on powder x-ray diffraction (PXRD) analysis, and compared with Al(OH)(3,5-PynDC) and Al(OH)IPA (FIG. 23).

Figure 24:
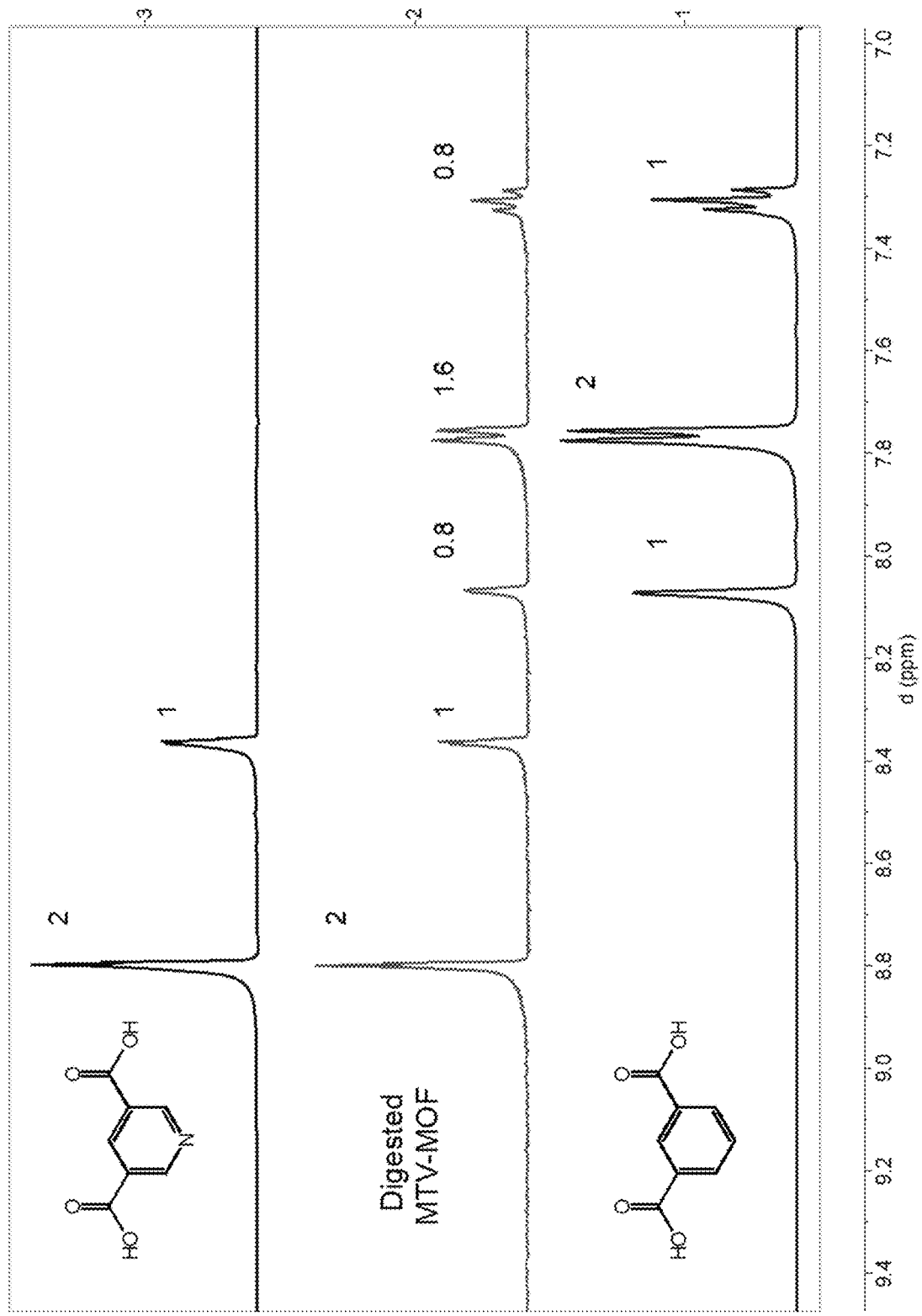
FIG. 24 depicts a $^1$H-Nuclear magnetic resonance (NMR) analysis conducted on the linkers H$_2$(3,5-PynDC) (top) and H$_2$IPA (bottom), as well as on the digested (i.e., treated as described in Example 5 below) MTV-MOF Al(OH)(3,5-PynDC)$_{0.56}$(IPA)$_{0.44}$. Numbers indicate the relative signal intensities of the respective peaks determined through integration.
Figure 25:
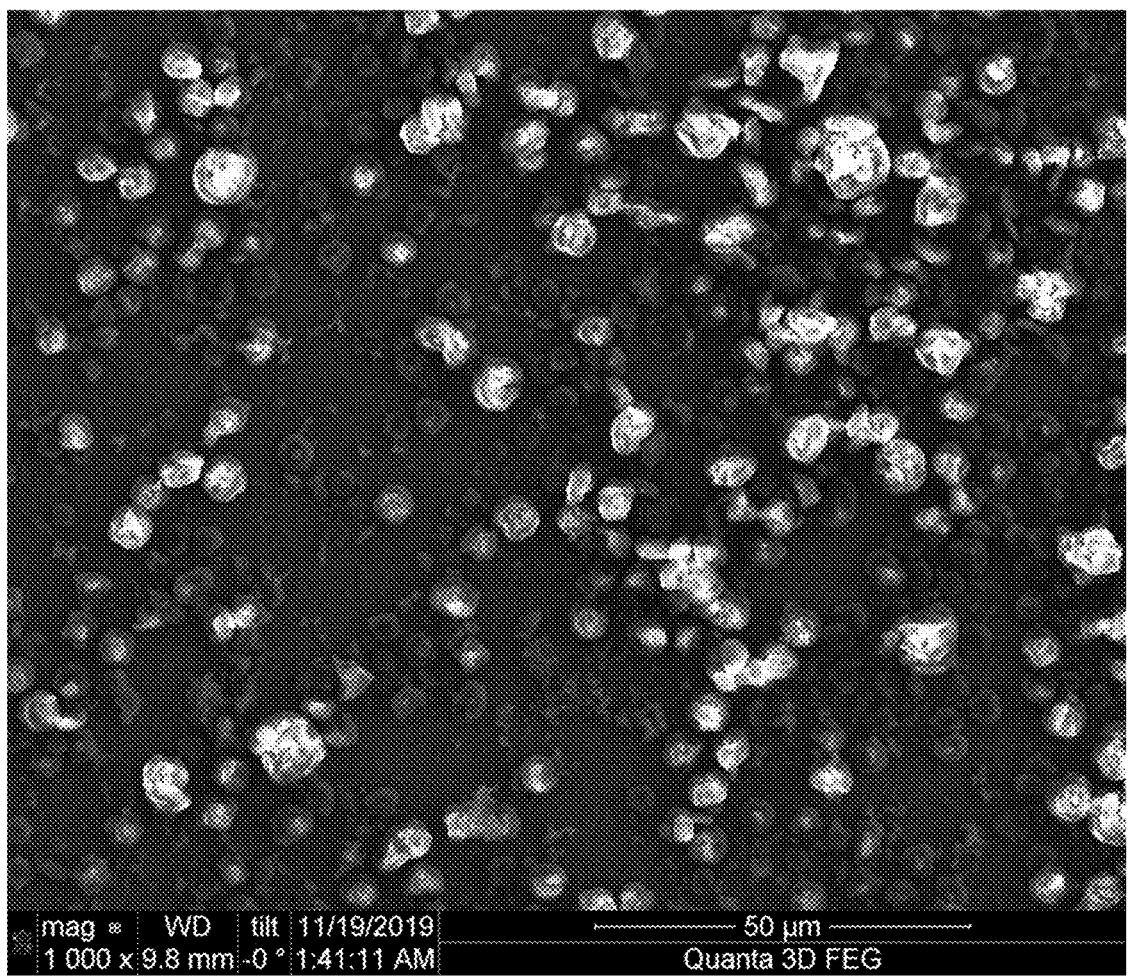
FIG. 25 depicts a representative scanning electron microscopy (SEM) micrograph of the MTV-MOF Al(OH)(3,5-PynDC)$_{0.56}$(IPA)$_{0.44}$.
Figure 26A:
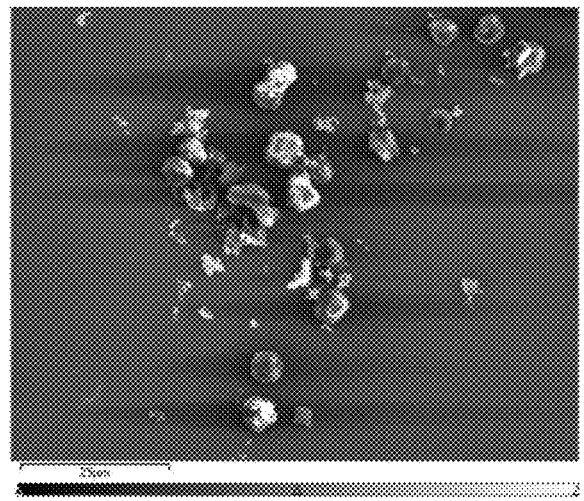
FIGS. 26A-E depict representative scanning electron microscopy (SEM) micrographs and energy dispersive X-ray spectroscopy (EDS) analyses of the MTV-MOF Al(OH)(3,5-PynDC)$_{0.56}$(IPA)$_{0.44}$.
Figure 26B:
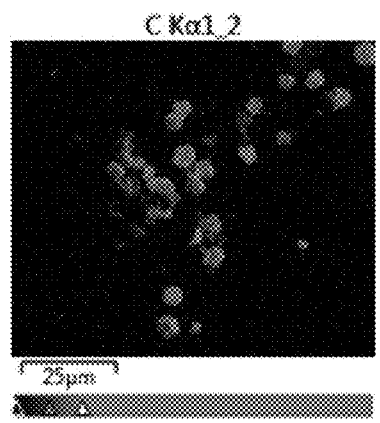
Figure 26C:
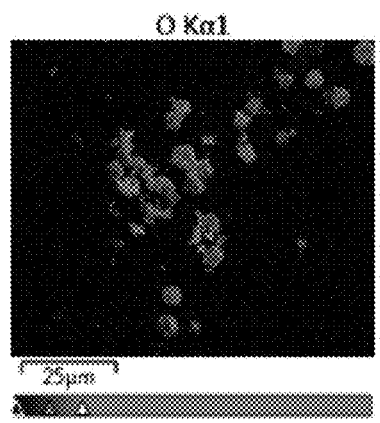
Figure 26D:
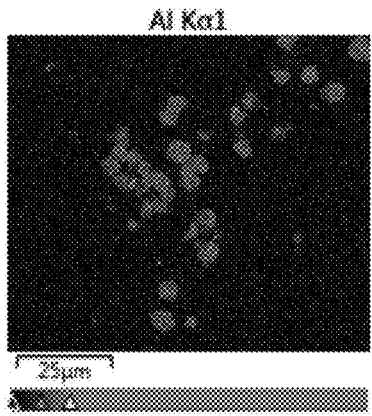
Figure 26E:
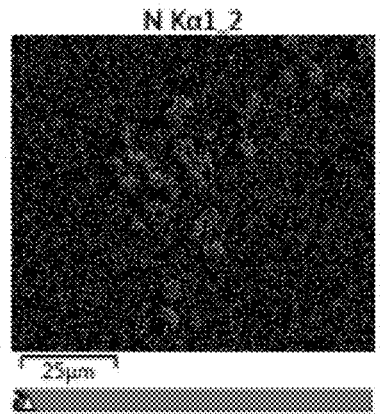

NMR Analysis:

Washed and activated samples were subjected to NaOD solution (5% in D$_2$O) prior to nuclear magnetic resonance (NMR) analysis. Under these conditions, the aluminum MTV-MOF dissolved into its components, such that solution-based $^1$H-NMR analysis could be employed to analyze its linker molecule composition (FIG. 24).

Scanning Electron Microscopy (SEW) Micrograph and Energy Dispersive X-Ray Spectroscopy (EDS) Analysis:

An SEM micrograph and EDS analysis of the MTV-MOF Al(OH)(3,5-PynDC)$_{0.56}$(IPA)$_{0.44}$ (FIGS. 25 and 26A-E) indicated even distribution of the elements carbon (C), oxygen (O), aluminum (Al), and sulfur (S) in all crystals. Together with the NMR data, this indicated that both linkers are present and evenly distributed in all crystals.

Water Sorption Properties:

Water sorption analyses on Al(OH)(3,5-PynDC), the MTV-MOF Al(OH)(3,5-PynDC)$_{0.56}$(IPA)$_{0.44}$, and Al(OH)

Figure 27:
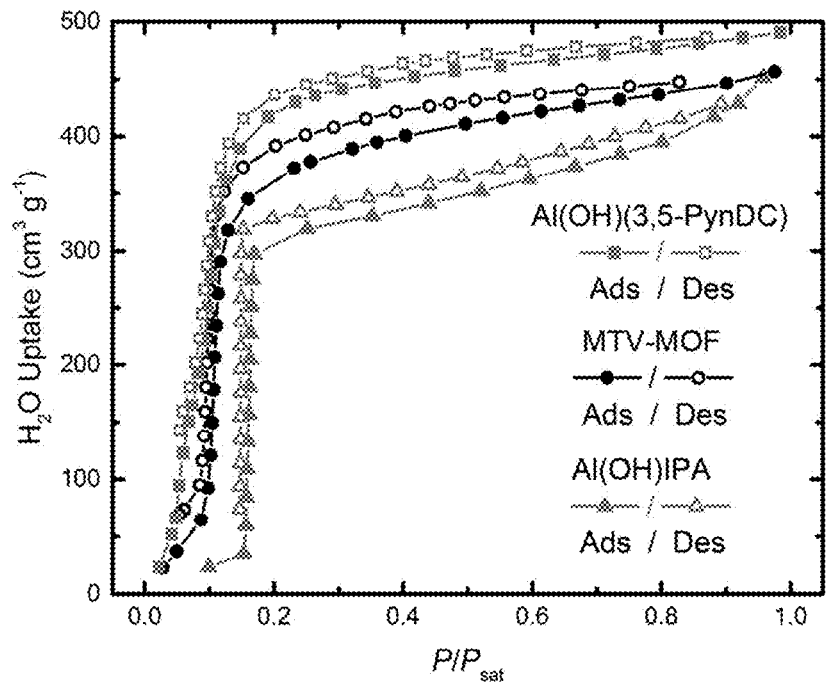
FIG. 27 depicts a water sorption analyses on Al(OH)(3,5-PynDC), the MTV-MOF Al(OH)(3,5-PynDC)$_{0.56}$(IPA)$_{0.44}$, and Al(OH)IPA at 25° C. (P: partial vapor pressure, P$_{sat}$: saturation vapor pressure at 25° C.).
Figure 28:
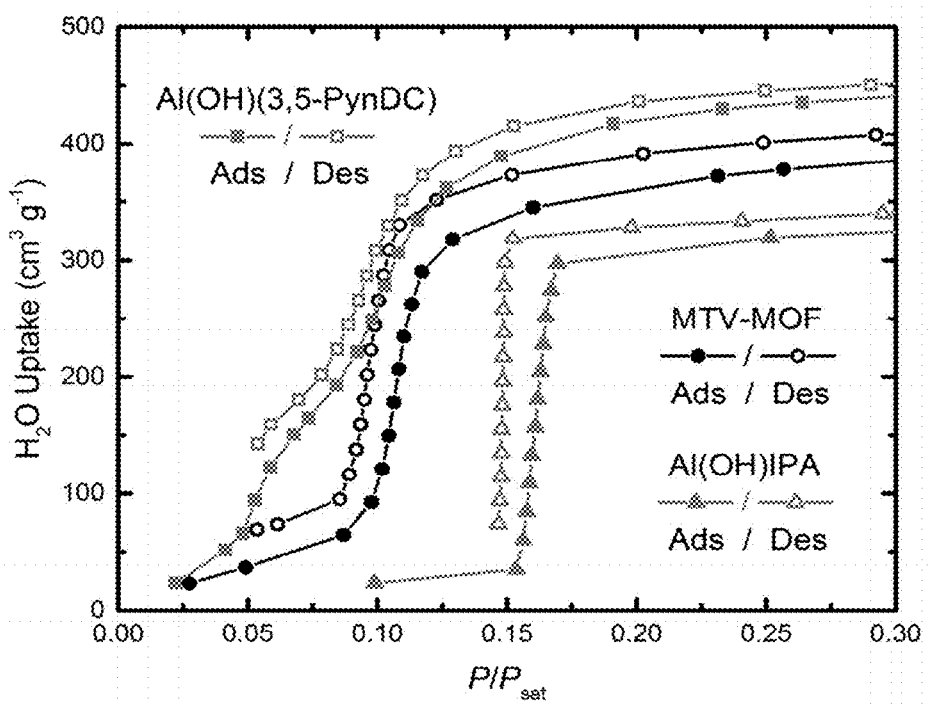
FIG. 28 depicts a low pressure region of the water sorption analyses on Al(OH)(3,5-PynDC), the MTV-MOF Al(OH)(3,5-PynDC)$_{0.56}$(2,4-TDC)$_{0.44}$, and Al(OH)IPA at 25° C. (P: partial vapor pressure, P$_{sat}$: saturation vapor pressure at 25° C.).

IPA at 25° C. (FIGS. 27 and 28) indicated that MTV-systems can be used to tune the water sorption properties of MOFs.

REFERENCES (1) World Economic Forum. *The Global Risks Report* 2018, 13th Edition; 2018.
(2) Mekonnen, M. M.; Hoekstra, A. Y. Four Billion People Facing Severe Water Scarcity. *Sci. Adv.* 2016, 2 (2), e1500323-e1500323.
(3) Vorosmarty, C. J. Global Water Resources: Vulnerability from Climate Change and Population Growth. *Science (80-.).* 2000, 289 (5477), 284-288.
(4) Wada, Y.; Gleeson, T.; Esnault, L. Wedge Approach to Water Stress. *Nat. Geosci.* 2014, 7 (9), 615-617.
(5) Wahlgren, R. V. Atmospheric Water Vapour Processor Designs for Potable Water Production: A Review. *Water Res.* 2001, 35 (1), 1-22.
(6) Klemm, O.; Schemenauer, R. S.; Lummerich, A.; Cereceda, P.; Marzol, V.; Corell, D.; Van Heerden, J.; Reinhard, D.; Gherezghiher, T.; Olivier, J.; et al. Fog as a Fresh-Water Resource: Overview and Perspectives. *Ambio* 2012, 41 (3), 221-234.
(7) Tomaszkiewicz, M.; Abou Najm, M.; Beysens, D.; Alameddine, I.; El-Fadel, M. Dew as a Sustainable Non-Conventional Water Resource: A Critical Review. *Environ. Rev.* 2015, 23 (4), 425-442.
(8) Cells, B. S.; Johansson, M. B.; Johansson, E. Accepted Article. No. Iv.
(9) Furukawa, H.; Gindara, F.; Zhang, Y.-B.; Jiang, J.; Queen, W. L; Hudson, M. R.; Yaghi, O. M. Water Adsorption in Porous Metal—Organic Frameworks and Related Materials. *J. Am. Chem. Soc.* 2014, 136 (11), 4369-4381.
(10) Fathieh, F.; Kalmutzki, M. J.; Kapustin, E. A.; Waller, P. J.; Yang, J.; Yaghi, O. M. Practical Water Production from Desert Air. *Sci. Adv.* 2018, 4 (6), eaat3198.
(11) Kalmutzki, M. J.; Diercks, C. S.; Yaghi, O. M. Metal-Organic Frameworks for Water Harvesting from Air. *Adv. Mater.* 2018, 1704304, 1704304.
(12) Deng, H.; Doonan, C. J.; Furukawa, H.; Ferreira, R. B.; Towne, J.; Knobler, C. B.; Wang, B., Yaghi, O. M. Multiple Functional Groups of Varying Ratios in Metal-Organic Frameworks. *Science (80-.).* 2010, 327 (5967), 846-850.
(13) Reinsch, H.; Van Der Veen, M. A.; Gil, B.; Marszalek, B.; Verbiest, T.; De Vos, D.; Stock, N. Structures, Sorption Characteristics, and Nonlinear Optical Properties of a New Series of Highly Stable Aluminum MOFs. *Chem. Mater.* 2013, 25 (1), 17-26.
(14) Cadiau, A.; Lee, J. S.; Damasceno Borges, D.; Fabry, P.; Devic, T.; Wharmby, M. T.; Martineau, C.; Foucher, D.; Taulelle, F.; Jun, C. H.; et al. Design of Hydrophilic Metal Organic Framework Water Adsorbents for Heat Reallocation. *Adv. Mater.* 2015, 27 (32), 4775-4780.
(15) Tschense, C. B. L.; Reimer, N.; Hsu, C. W.; Reinsch, H.; Siegel, R.; Chen, W. J.; Lin, C. H.; Cadiau, A.; Serre, C.; Senker, J.; et al. New Group 13 MIL-53 Derivates Based on 2,5-Thiophenedicarboxylic Acid. *Zeitschrift fur Anorg. und Alig. Chemie* 2017, 643 (21), 1600-1608.
(16) Lenzen, D.; Bendix, P.; Reinsch, H.; Fröhlich, D.; Kummer, H.; Möllers, M.; Hugenell, P. C.; Gläser, R.; Henninger, S.; Stock, N.; Scalable Green Synthesis and Full-Scale Test of the Metal-Organic Framework CAU-10-H for Use in Adsorption-Driven Chillers. *Adv. Mater.* 30, 1705869 (2018).

What is claimed is:

1. A metal-organic framework (MOF) composition, comprising repeating cores, wherein the cores comprise secondary building units connected to organic ligands, wherein the secondary building units comprise one or more metals or metal-containing complexes, wherein the organic ligands comprise one or more linear ditopic moieties, v-shaped ditopic moieties, trigonal tritopic moieties, square or rectangular tetratopic moieties, or tetrahedral tetratopic moieties, wherein the moieties comprise 5-membered or 6-membered rings substituted with at least two carboxylate groups, and wherein the secondary building units are connected to the organic ligands through the oxygen atoms of the carboxylate groups in the organic ligands;

wherein the organic ligands comprise one or more moieties of the following:

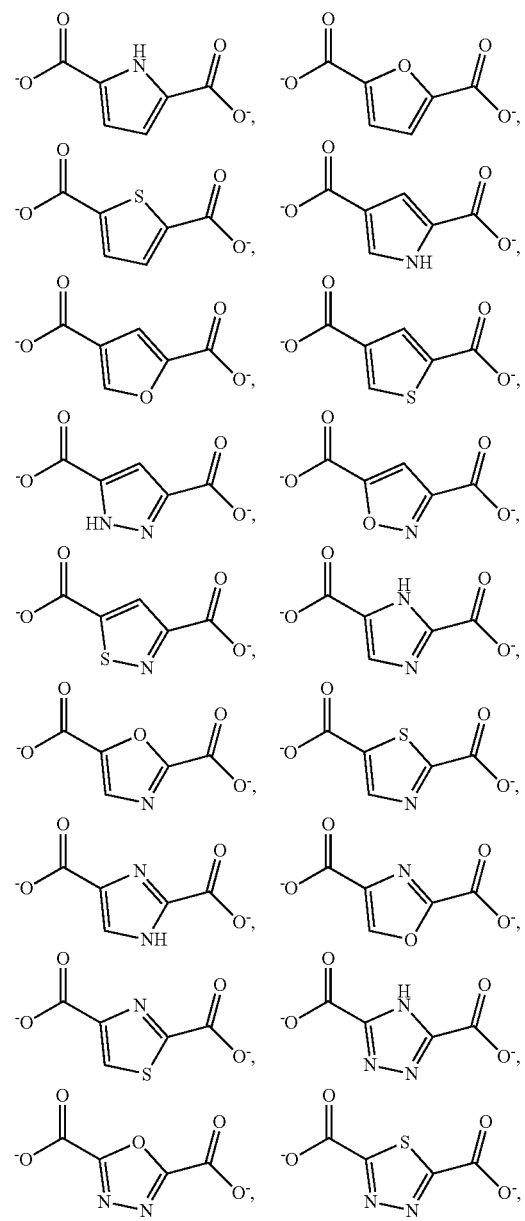

-continued

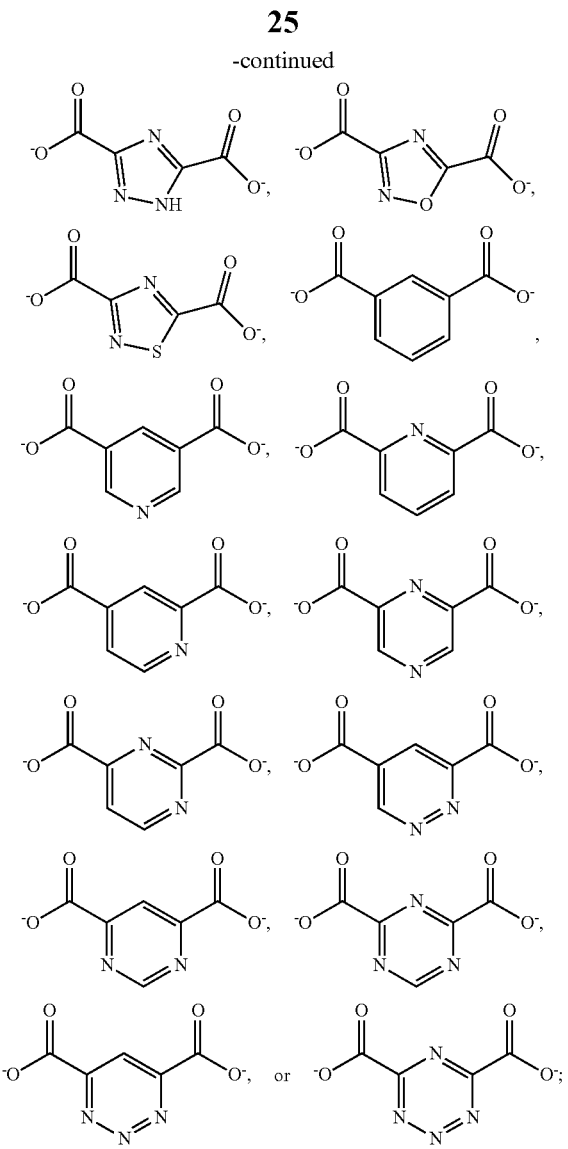

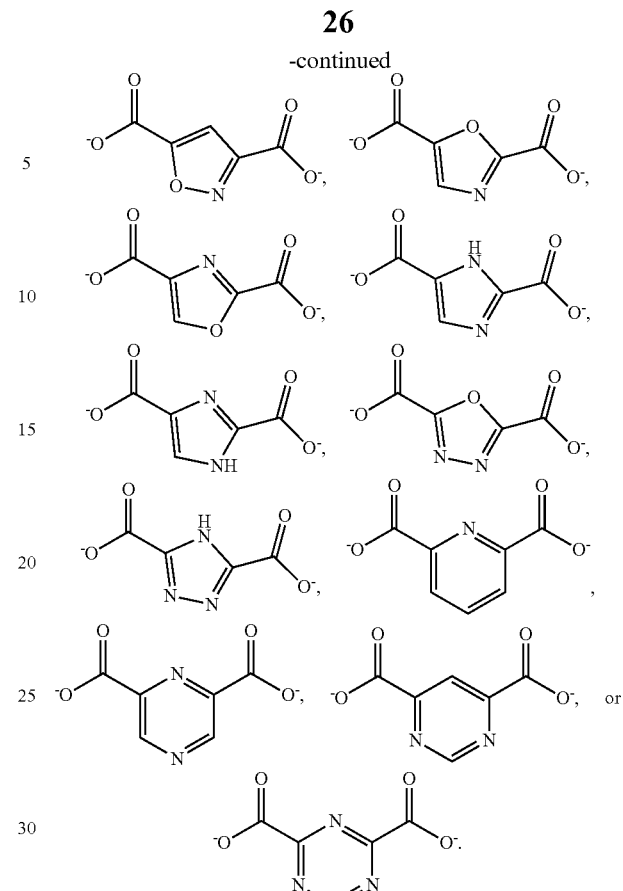

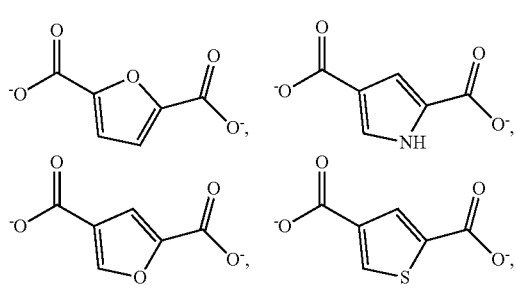

wherein each secondary building unit comprises aluminum hydroxide.

2. The composition of claim 1, wherein the secondary building units form 1D rod-like chains or distinct multinuclear metal clusters.

3. The composition of claim 1, wherein the MOF is a single-linker metal-organic framework.

4. The composition of claim 1, wherein each organic ligand comprises:

5. The composition of claim 1, wherein the MOF is MOF-313: Al(OH)(2,5-PyIDC).

6. The composition of claim 1, wherein the MOF is MOF-314: Al(OH)(2,4-PyIDC).

7. The composition of claim 1, wherein the MOF is MOF-323: Al(OH)(2,4-TDC).

8. The composition of claim 1, wherein the MOF is a multivariate metal-organic framework (MTV-MOF).

9. The composition of claim 8, wherein the MOF is Al(OH)(2,5-FDC)$_w$(2,4-TDC)$_v$, wherein w+v=1.

10. The composition of claim 8, wherein the MOF is Al(OH)(3,5-PynDC)$_m$(IPA)$_n$, wherein m+n=1.

11. The composition of claim 1, wherein the secondary building units form 1D rod-like chains, and the organic ligands comprise one or more v-shaped ditopic moieties.

12. The composition of claim 1, wherein the secondary building units are connected to the organic ligands through the oxygen atoms of the carboxylate groups in the organic ligands via a cis-edge-shared octahedra geometry or a trans-edge-shared octahedra geometry.

13. A water sorption system, comprising a water adsorbent comprising a MOF composition of claim 1.

14. The system of claim 13 configured as a heat pump, dehumidifier, adsorption refrigerator, solar cooling system, dryer, organic light emitting device or secondary battery device.

15. The system of claim 13 configured as a water harvesting system.

16. The system of claim 15, further comprising a condenser adjacent to the adsorbent layer.

17. The system of claim 15, wherein the system is a passive water harvesting system.

18. A method of using the MOF composition of claim 1, comprising containing in, storing in and/or extracting from the MOF a predetermined gas or fluid.

19. The method of claim 18, wherein the gas or fluid is $CO_2$, $H_2O$, $H_2$, $CH_4$, $C_2H_4$, or $C_2H_2$, or any combinations thereof.

20. A method of water harvesting, comprising:
adsorbing water from ambient atmosphere using a water-harvesting system, wherein the water-harvesting system comprises a MOF composition of claim 1;
desorbing vapor from the one or more MOFs; and
collecting water from the vapor using a condenser.

* * * * *